(12) United States Patent
Hersam et al.

(10) Patent No.: US 7,662,298 B2
(45) Date of Patent: Feb. 16, 2010

(54) SEPARATION OF CARBON NANOTUBES IN DENSITY GRADIENTS

(75) Inventors: Mark C. Hersam, Evanston, IL (US); Samuel I. Stupp, Chicago, IL (US); Michael S. Arnold, Northbrook, IL (US)

(73) Assignee: Northwestern University, Evanston, IL (US)

( * ) Notice: Subject to any disclaimer, the term of this patent is extended or adjusted under 35 U.S.C. 154(b) by 557 days.

(21) Appl. No.: 11/368,581

(22) Filed: Mar. 6, 2006

(65) Prior Publication Data

US 2009/0173918 A1    Jul. 9, 2009

Related U.S. Application Data

(60) Provisional application No. 60/658,502, filed on Mar. 4, 2005.

(51) Int. Cl.
*B01D 21/26* (2006.01)
*D01F 9/12* (2006.01)

(52) U.S. Cl. ............... 210/781; 210/787; 210/789; 210/360.1; 210/380.1; 423/447.1; 423/461; 977/750

(58) Field of Classification Search ............... 210/787, 210/789, 360.1, 380.1, 781; 423/445 R, 423/447.1, 461; 204/173; 977/750
See application file for complete search history.

(56) References Cited

U.S. PATENT DOCUMENTS 6,232,706 B1    5/2001    Dai et al.
6,591,658 B1    7/2003    Yedur et al.
6,669,918 B2   12/2003    Schleier-Smith et al.
6,706,566 B2    3/2004    Avouris et al.
6,749,826 B2    6/2004    Tillotson et al.
6,905,667 B1    6/2005    Chen et al.
6,936,233 B2    8/2005    Smalley et al.
6,936,322 B2    8/2005    Sakakibara et al.
6,974,927 B2   12/2005    Hannah
7,038,299 B2    5/2006    Furukawa et al.
7,070,754 B2    7/2006    Smalley et al.
7,074,310 B2    7/2006    Smalley et al.
7,074,379 B2    7/2006    Moy et al.
7,098,151 B2    8/2006    Moriya et al.
7,115,864 B2   10/2006    Colbert et al.
7,118,693 B2   10/2006    Glatkowski et al.
7,131,537 B2   11/2006    Papadimitrakopoulos
7,166,266 B2    1/2007    Nikolaev et al.
7,247,670 B2    7/2007    Malenfant et al.
7,261,852 B2    8/2007    Rinzler et al.

(Continued)

FOREIGN PATENT DOCUMENTS

JP            08-231210         9/1996

(Continued)

OTHER PUBLICATIONS

The International Preliminary Report on Patentability of PCT/US2006/007863 which was issued on Sep. 12, 2007.*

(Continued)

*Primary Examiner*—David A Reifsnyder
(74) *Attorney, Agent, or Firm*—K&L Gates LLP

(57) ABSTRACT

The separation of single-walled carbon nanotubes (SWNTs), by chirality and/or diameter, using centrifugation of compositions of SWNTs in and surface active components in density gradient media.

22 Claims, 22 Drawing Sheets

U.S. PATENT DOCUMENTS

| | | | |
|---|---|---|---|
| 7,354,563 | B2 | 4/2008 | Smalley et al. |
| 7,357,906 | B2 | 4/2008 | Colbert et al. |
| 7,374,685 | B2 | 5/2008 | Sun |
| 7,390,477 | B2 | 6/2008 | Smalley et al. |
| 2001/0050219 | A1 | 12/2001 | Anazawa et al. |
| 2003/0199100 | A1 | 10/2003 | Wick |
| 2004/0191157 | A1 | 9/2004 | Harutyunyan et al. |
| 2004/0197546 | A1 | 10/2004 | Rinzler et al. |
| 2004/0232073 | A1 | 11/2004 | Papadimitrakopoulos |
| 2004/0241079 | A1 | 12/2004 | Takenobu et al. |
| 2004/0245088 | A1 | 12/2004 | Gardner |
| 2005/0009039 | A1 | 1/2005 | Jagota et al. |
| 2005/0129382 | A1 | 6/2005 | Sakakibara et al. |
| 2005/0254760 | A1 | 11/2005 | Sakakibara et al. |
| 2006/0057290 | A1 | 3/2006 | Glatkowski et al. |
| 2006/0113510 | A1 | 6/2006 | Luo et al. |
| 2006/0231399 | A1 | 10/2006 | Smalley et al. |
| 2006/0240238 | A1 | 10/2006 | Boussaad et al. |
| 2006/0242741 | A1 | 10/2006 | Krupke et al. |
| 2006/0274049 | A1 | 12/2006 | Spath et al. |
| 2007/0045119 | A1 | 3/2007 | Sandhu |
| 2007/0224106 | A1 | 9/2007 | Sakakibara et al. |
| 2008/0217588 | A1 | 9/2008 | Arnold et al. |
| 2008/0258117 | A1 | 10/2008 | Sakakibara et al. |
| 2009/0061194 | A1 | 3/2009 | Green et al. |

FOREIGN PATENT DOCUMENTS

| | | |
|---|---|---|
| JP | 2006-188379 | 7/2006 |
| JP | 2006-188380 | 7/2006 |
| JP | 2008-266111 | 11/2008 |
| JP | 2008-285386 | 11/2008 |
| JP | 2008-285387 | 11/2008 |
| WO | 2004/069736 | 8/2004 |
| WO | 2004082794 | 9/2004 |
| WO | 2005/041227 | 5/2005 |
| WO | 2005/077827 | 8/2005 |
| WO | 2006/013788 | 2/2006 |
| WO | 2006/075968 | 7/2006 |
| WO | WO 2006096613 A2 * | 9/2006 |
| WO | 2006/137943 | 12/2006 |
| WO | 2008/010383 | 1/2008 |
| WO | 2008/038007 | 4/2008 |
| WO | 2008/057070 | 5/2008 |
| WO | 2008/057108 | 5/2008 |
| WO | 2008143281 | 11/2008 |

OTHER PUBLICATIONS

Arnold, MS, Stupp, SI; and Hersam, MC; Enrichment of Single-Walled Carbon Nanotubes by Diameter in Density Gradients; Nano Letters, 2005, 713-718, vol. 5, No. 4.

Arnold et al., "Sorting carbon nanotubes by electronic structure using density differentiation," *Nature Nanotechnology*, 1:60-65 (2006).

Arnold et al., "Hydrodynamic characterization of surfactant encapsulated carbon nanotubes using an analytical ultracentrifuge," *ACS Nano*, Oct. 3, 2008 (web).

Green et al., "Ultracentrifugation of single-walled carbon nanotubes," *Materials Today*, 10(12):59-60 (2007).

Green et al., "Colored semitransparent conductive coatings consisting of monodisperse metallic single-walled carbon nanotubes," *Nano Lett.*, 8(5):1417-1422 (2008).

Hersam, "Progress towards monodisperse single-walled carbon nanotubes," *Nature Nanotechnology*, 3:387-394 (2008).

Samsonidze et al., "Quantitative evaluation of the octadecylamine-assisted bulk separation of semiconducting and metallic single-wall carbon nanotubes by resonance Raman spectroscopy," *Applied Physics Letters*, 85(6):1006-1008 (2004).

Wu et al., "Transparent, Conductive Carbon Nanotube Films," *Science*, 305:1273-1276 (2004).

Yanagi et al., "Optical and Conductive Characteristics of Metallic Single-Wall Carbon Nanotubes with Three Basic Colors; Cyan, Magenta, and Yellow," *Applied Physics Express*, 1:034003-1-034003-3 (2008).

Zhang et al., "Transparent, Conductive, and Flexible Carbon Nanotube Films and Their Application in Organic Light-Emitting Diodes," *Nano. Letters*, 6(9):1880-1886 (2006).

Zhou et al., "A method of printing carbon nanotube thin films," *Applied Physics Letters*, 88:123109-1-123109-3 (2006).

M. S. Arnold, "Carbon nanotubes: Photophysics, biofunctionalization, and sorting via density differentiation," PhD Thesis, Northwestern University, Dec. 2006.

Chattopadhyay et al., "A Route for Bulk Separation of Semiconducting from Metallic Single-Wall Carbon Nanotubes," *J. Am. Chem. Soc.*, 125:3370-3375 (2003).

Maeda et al., "Large-Scale Separation of Metallic and Semiconducting Single-Walled Carbon Nanotubes," *J. Am. Chem. Soc.*, 127:10287-10290 (2005).

Strano et al., "Understanding the Nature of the DNA-Assisted Separation of Single-Walled Carbon Nanotubes Using Fluorescence and Raman Spectroscopy," *Nano. Lett.*, 4(4): 543-550 (2004).

Zhang et al., "Selective Etching of Metallic Carbon Nanotubes by Gas-Phase Reaction," *Science*, 314:974-977 (2006).

Zheng et al., "DNA-assisted dispersion and separation of carbon nanotubes," *Nature Materials*, 2: 338-342 (2003).

* cited by examiner

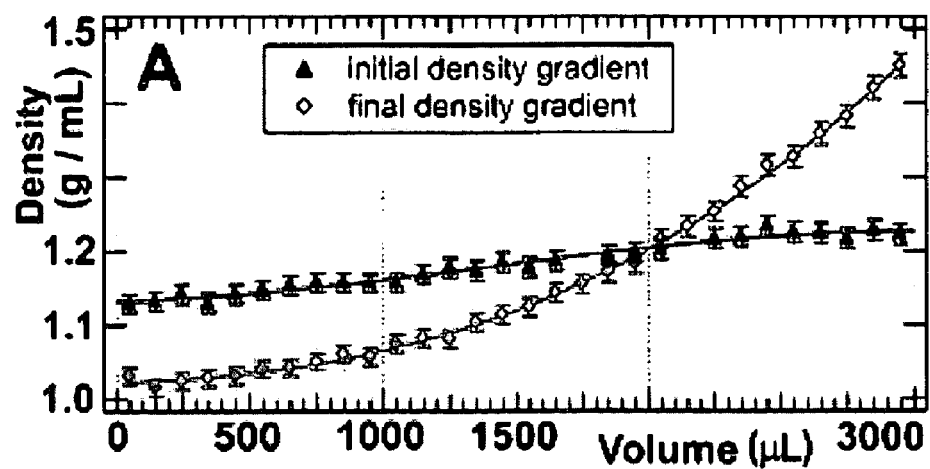
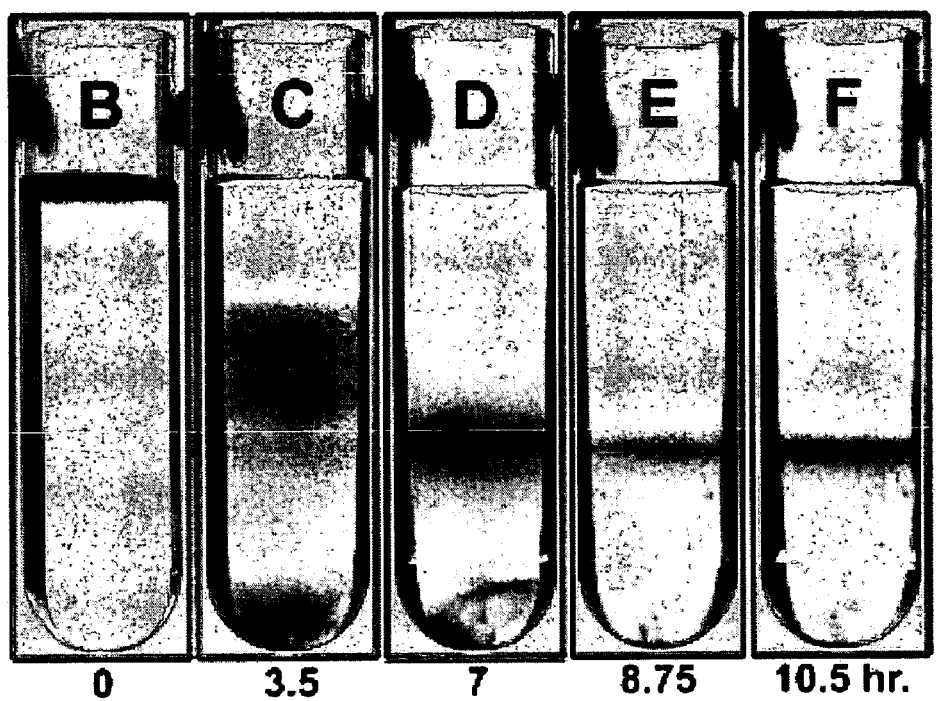
Figures 1A-F

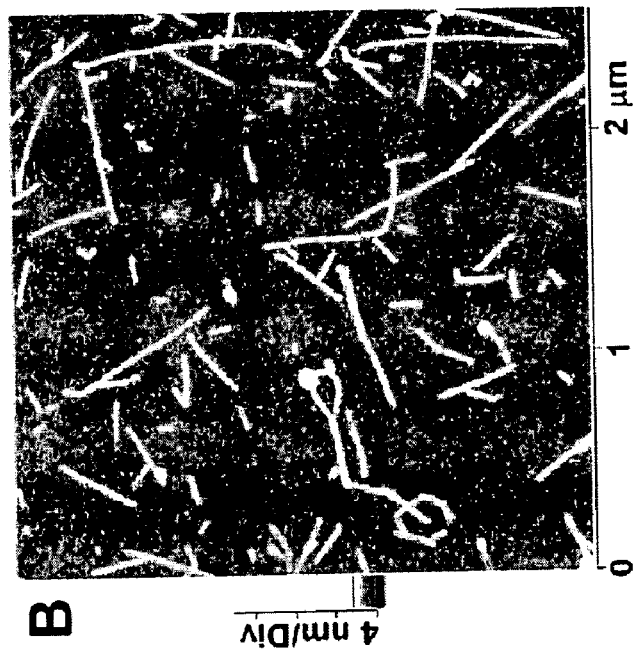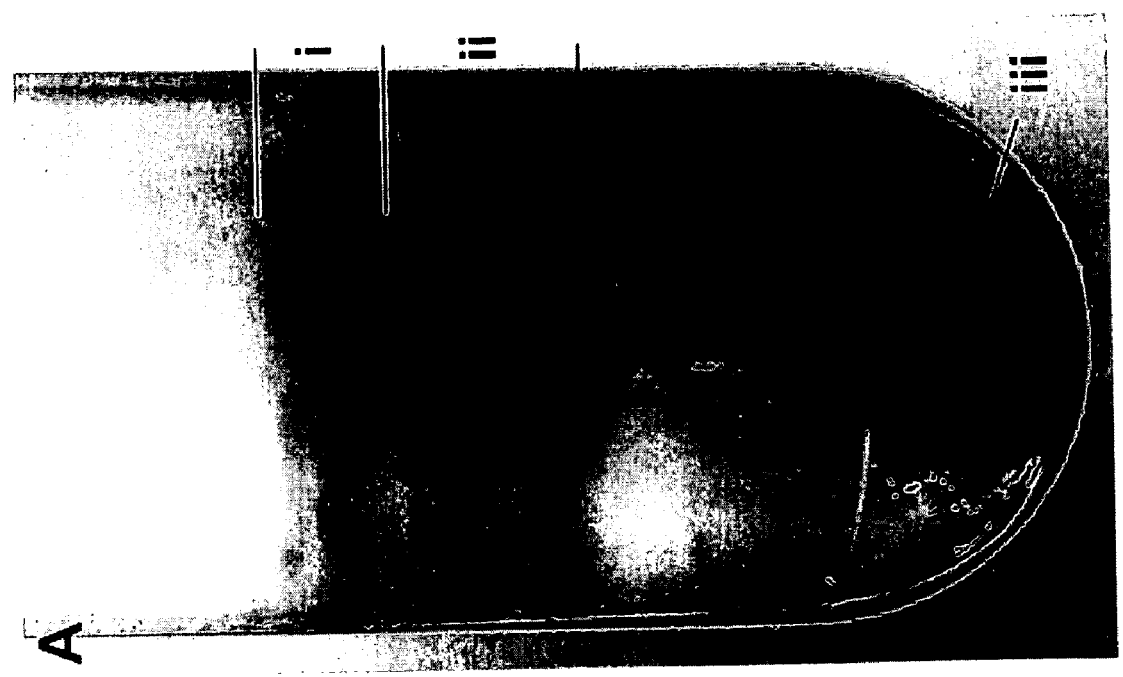
Figures 2A-B

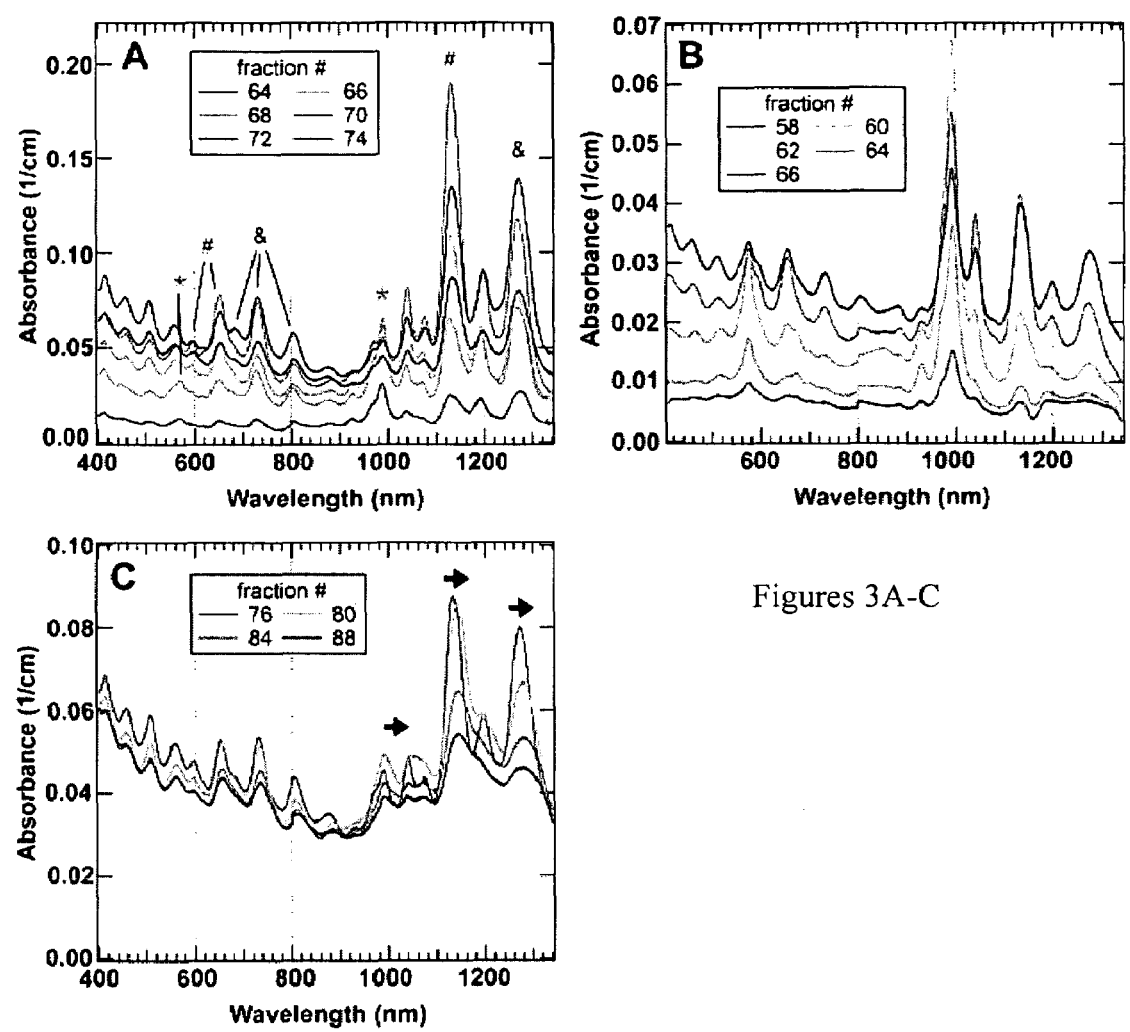
Figures 3A-C

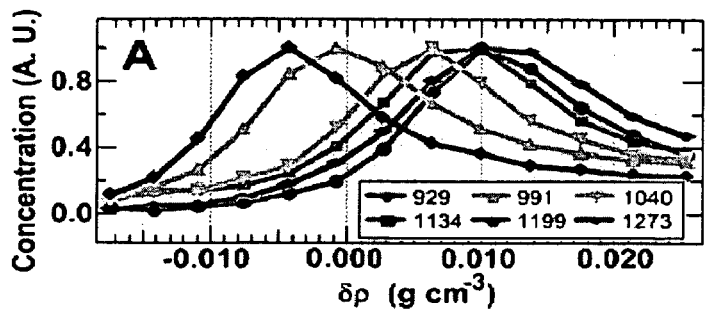
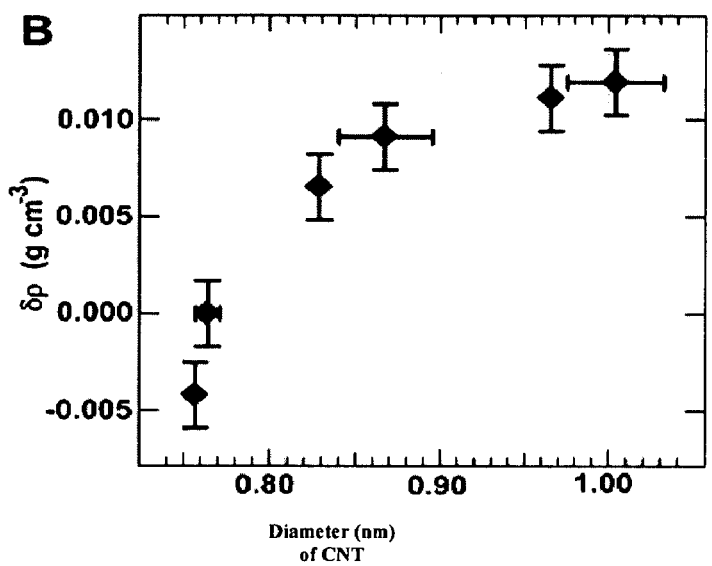
Figures 4A-B
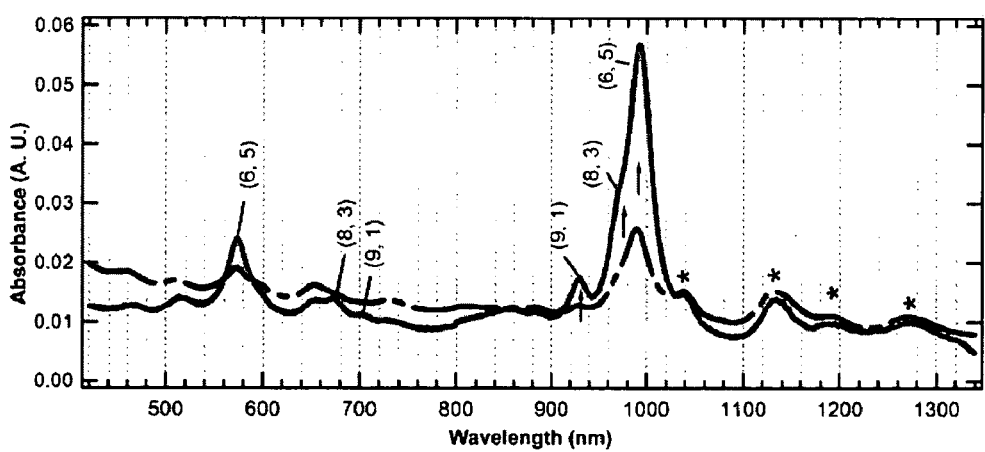
Figure 5

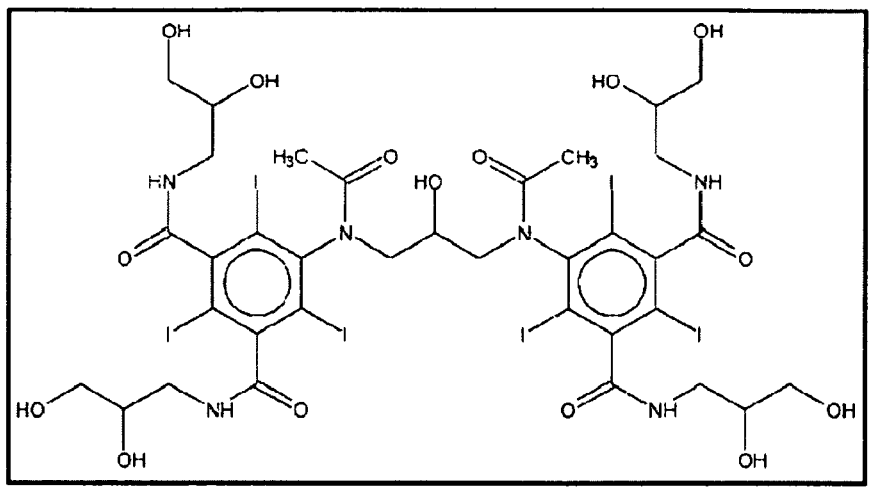
Figure 6
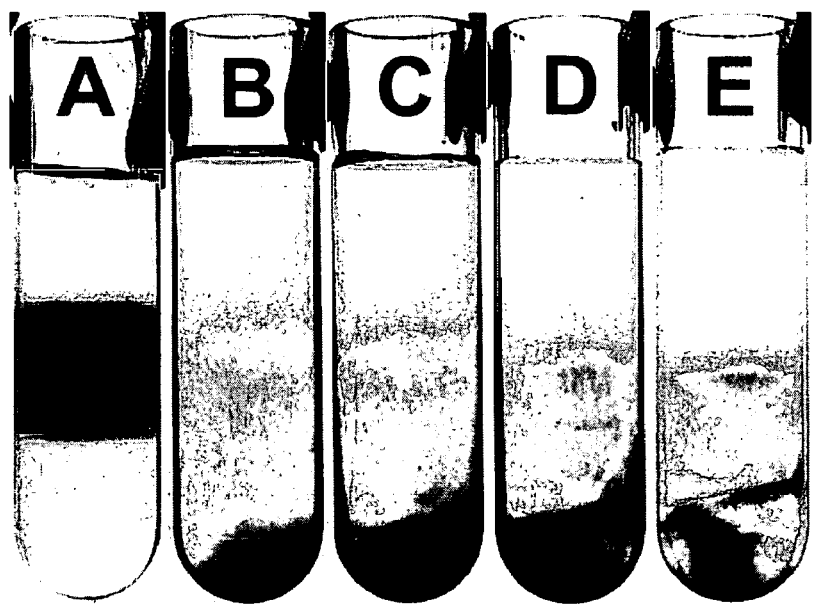
Figures 7A-E

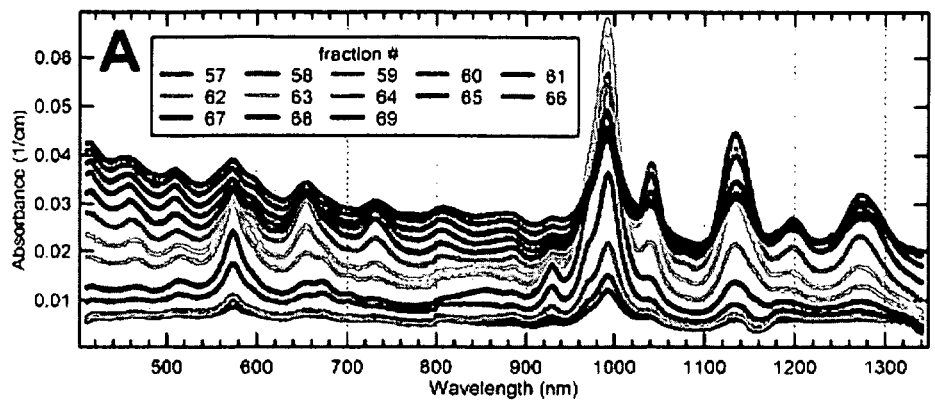
Figures 8A-B
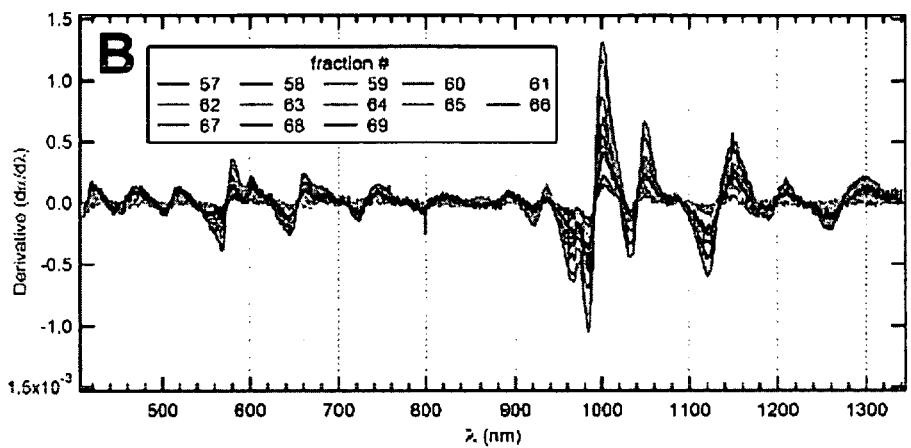
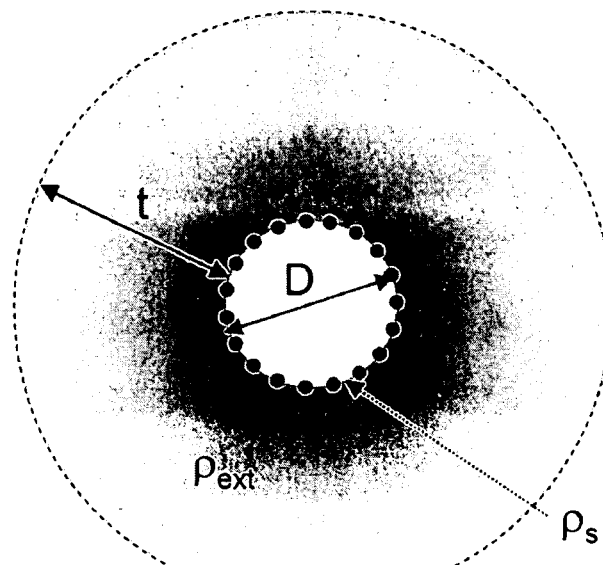
Figure 9

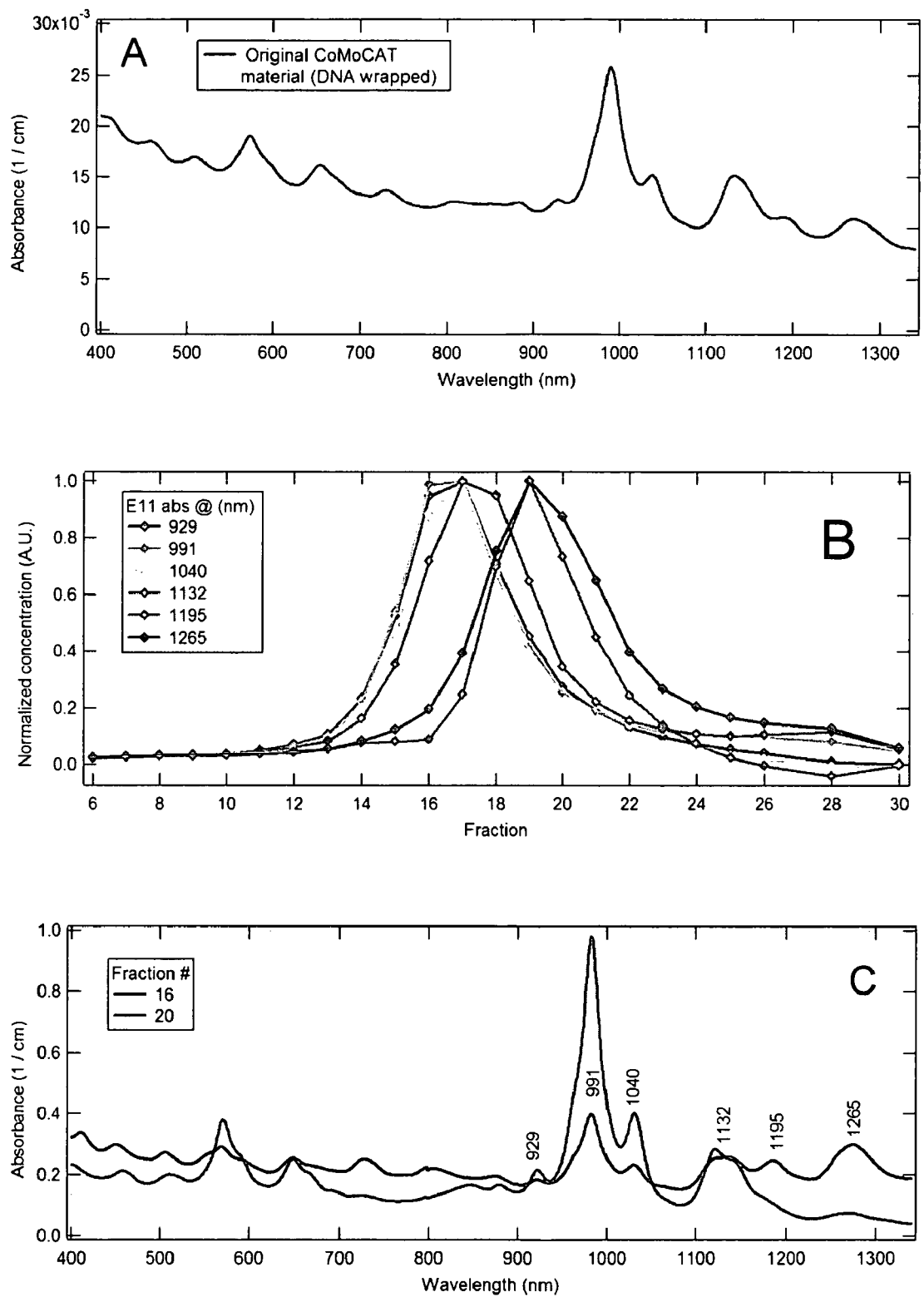
Figure 10A-C

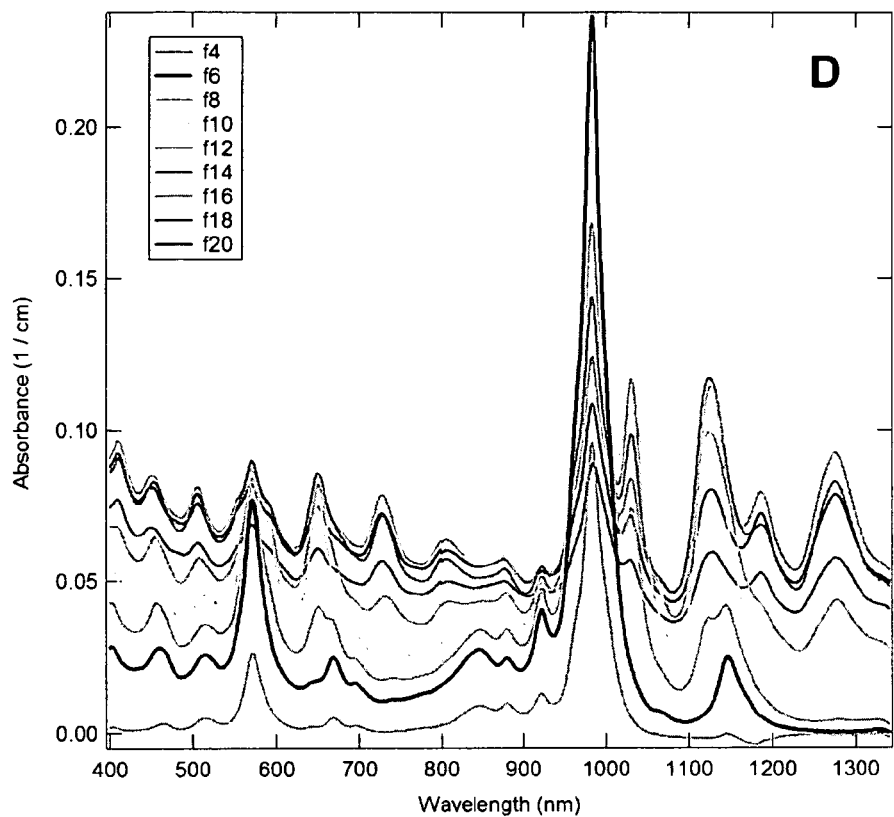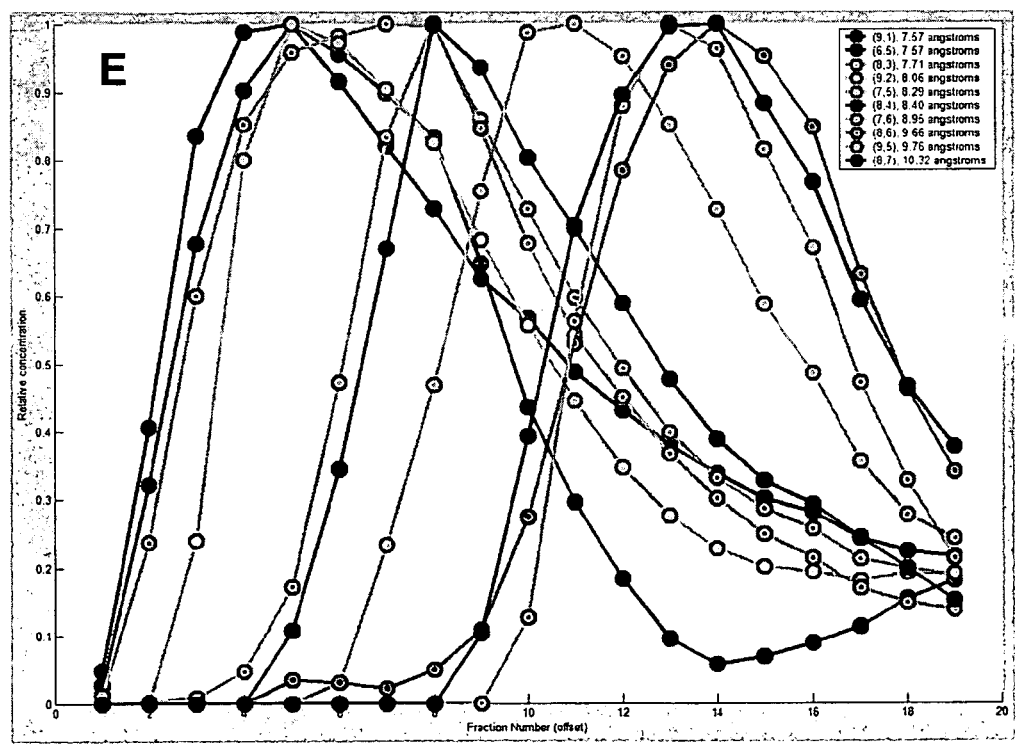
Figure 10D-E

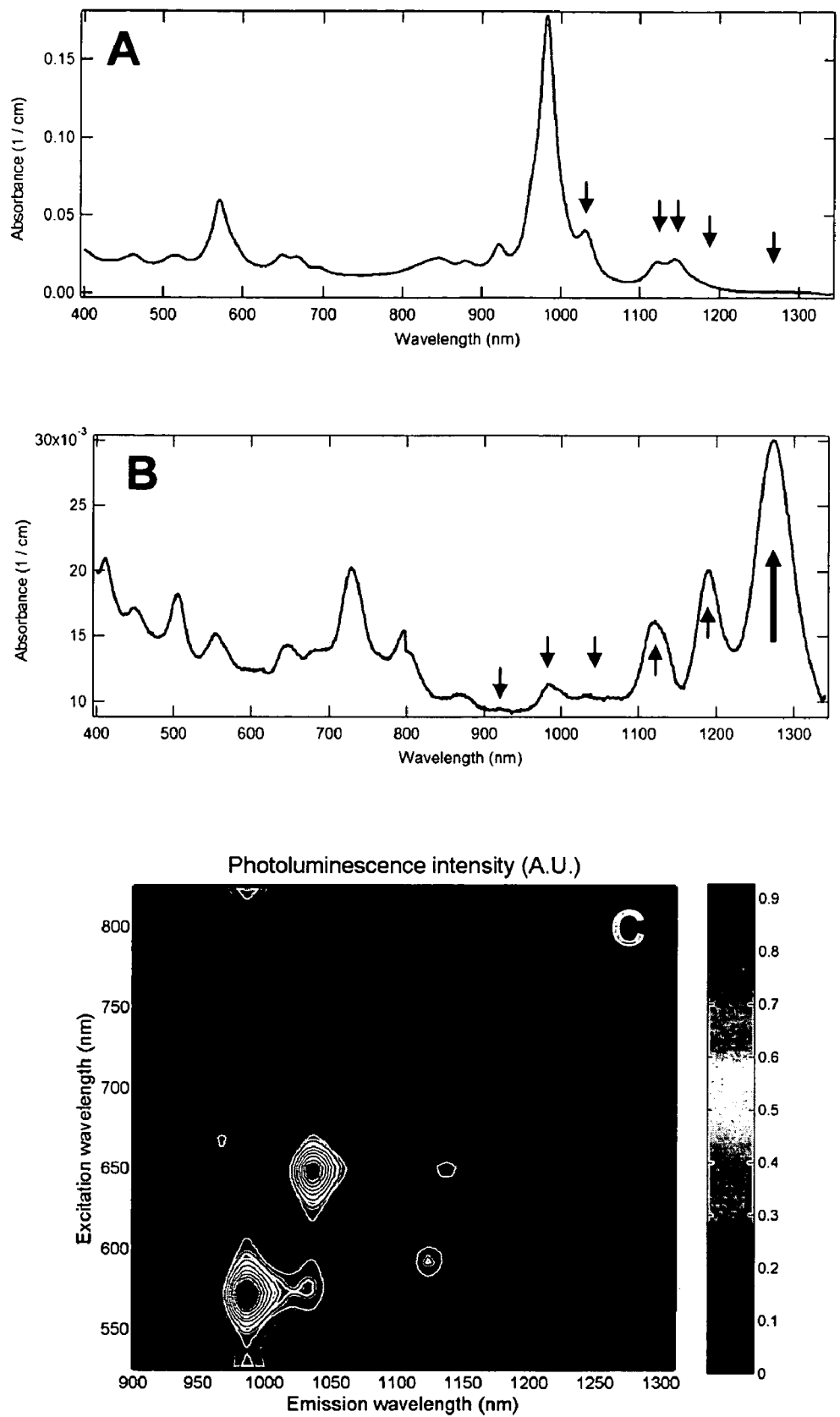
Figure 11A-C

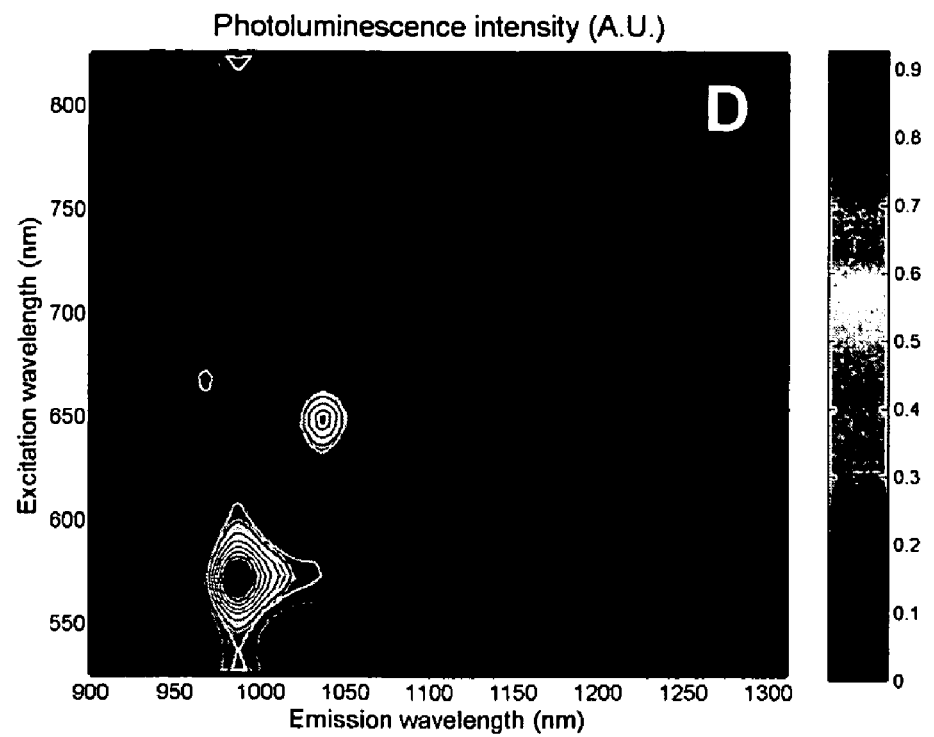
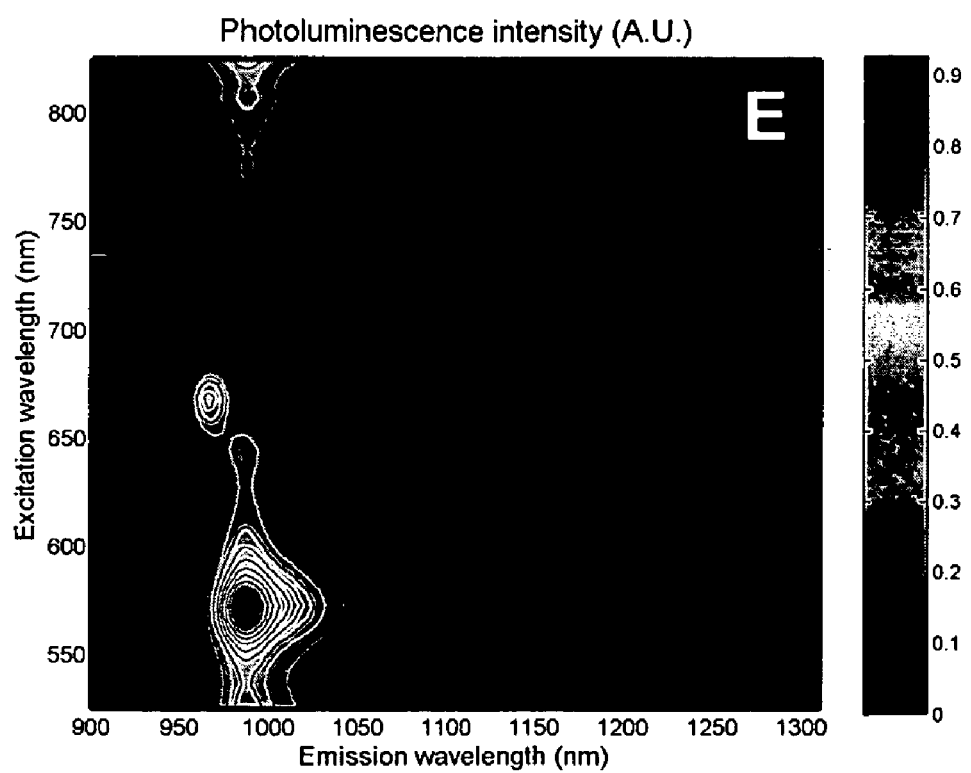
Figure 11D-E

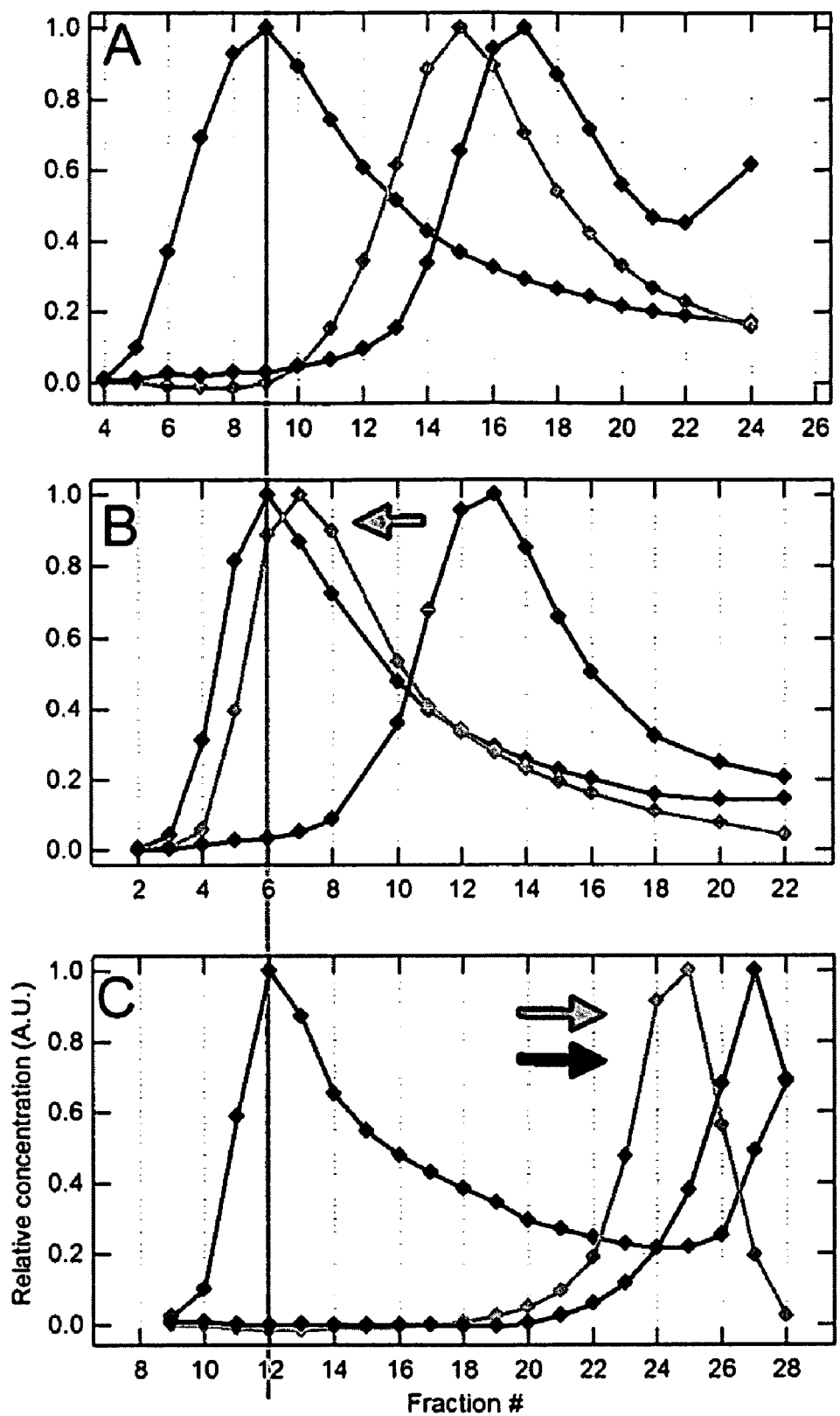
Figures 15A-C

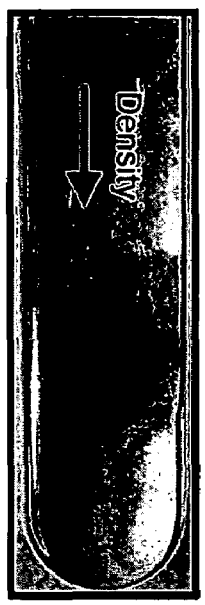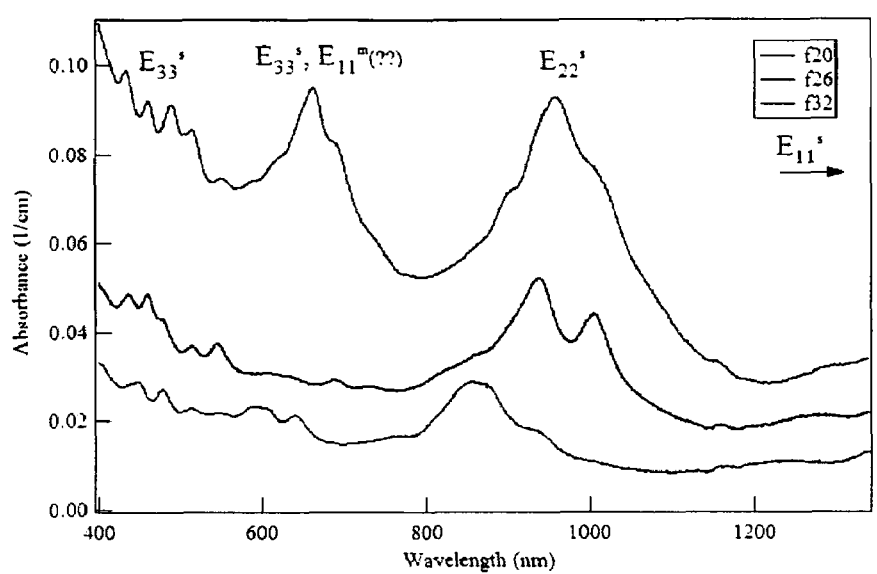
Figure 16

SEPARATION OF CARBON NANOTUBES IN DENSITY GRADIENTS

This application claims priority benefit from prior provisional application Ser. No. 60/658,502, filed Mar. 4, 2005, the entirety of which is incorporated herein by reference.

The United States government has certain rights to this invention pursuant to Grant Nos. DMR-0134706 and EEC-0118025 from the National Science Foundation and Grant No. DE-FG02-00ER45810/A001 from the Department of Energy, all to Northwestern University.

BACKGROUND OF THE INVENTION

The utilization of single-walled carbon nanotubes (SWNTs) in large quantities in the fields of molecular electronics, opto-electronics, and biological sensing will require SWNTs of the same physical structure, electronic-type, and band gap. Since current methods of synthesis produce mixtures of nanotubes with different physical structures and electrical properties, the development of methods for the post-production separation of these one-dimensional materials is necessary. Towards this end, progress has been reported in the separation of semiconducting from metallic SWNTs using controlled electrical breakdown, dielectrophoresis, and chemical moieties that selectively react with either type of nanotube.

SWNTs have been used in conjunction with various separation techniques, including anion exchange media, the protonation and ozonation of nanotube-sidewalls, and the light-induced oxidation of carbon nanotubes. However, such procedures chemically or structurally modify the nanotubes, at risk of compromising their properties and utility. Accordingly, the search for an efficient, economical separation method remains an ongoing concern in the art.

SUMMARY OF THE INVENTION

In light of the foregoing, it is an object of the present invention to provide one or more methods and/or systems relating to the separation of carbon nanotubes, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of this invention to provide one or more separation methods with or without covalent nanotube modification.

It can be another object of this invention to provide methods and related systems for nanotube separation, regardless of diameter or length dimension, thereby compatible with various nanotube production techniques and resulting in separation on a practical size-scale.

It can be another object of the present invention to provide such separation methods and systems which can be used in conjunction with existing automation and scalable for production of commercially-useful quantities.

Other objects, features, and advantageous of the present invention will be apparent from the summary and the following descriptions of certain embodiments, and will be readily apparent to those skilled in the art knowledgeable regarding the production and properties of carbon nanotubes and related separation techniques. Such objects, features, benefits and advantages will be apparent from the above as taken into conjunction with the accompanying examples, data, figures and all reasonable inferences to be drawn there from, alone or with consideration of the references incorporated herein.

In part, this invention can be directed to a method of using a density gradient to separate carbon nanotubes. Such a method can comprise providing a fluid medium comprising a density gradient; contacting such a medium and a composition comprising a mixture of carbon nanotubes of varying diameter and/or chirality, and one or more surface active components; and centrifuging the medium and composition for a time and/or rotational rate at least partially sufficient to separate the nanotube mixture along the medium gradient. Such a method is without limitation as to nanotube diameter and/or chirality. In certain embodiments, single-walled nanotubes can independently have diameter dimensions up to about 20 Å or more. Regardless, in certain embodiments, dimensions can range from about 7 to about 10 Å, while in certain other embodiments, dimensions can range from about 12 to about 15 Å.

The carbon nanotubes can be provided in composition with a surface active component of the sort understood by those skilled in the art made aware of this invention. Generally, such a component can function, in conjunction with a particular fluid medium, to reduce nanotube aggregation. In certain embodiments, such a component can be selected from a wide range of single strand DNA components. In certain other embodiments, such a component can be selected from salts of one or more cholic acids and combinations thereof. With regard to the former, such components can be selected from $d(GT)_n$ strands, where without limitation n can be an integer between about 15 and about 35. With regard to the latter, such components can be selected from a cholate, a deoxycholate, a taurodeoxycholate and combinations thereof.

Fluid media useful with this invention are limited only by carbon nanotube aggregation therein to an extent precluding at least partial separation. Accordingly, without limitation, aqueous and non-aqueous fluids can be used in conjunction with any substance soluble or dispersible therein, over a range of concentrations so as to provide the medium a density gradient for use in the separation techniques described herein. Such substances can be ionic or non-ionic, non-limiting examples of which include inorganic salts and alcohols, respectively. In certain embodiments, as illustrated more fully below, such a medium can comprise a range of aqueous iodixanol concentrations and the corresponding gradient of concentration densities. Likewise, as illustrated below, the methods of this invention can be influenced by gradient slope, as affected by length of centrifuge compartment and/or angle of centrifugation.

Regardless of medium identity or density gradient, composition contact can comprise introducing one or more of the aforementioned nanotube compositions on or at any point within the gradient, before centrifugation. In certain embodiments, such a composition can be introduced at a position along the gradient which can be substantially invariant over the course of centrifugation. For reasons described more fully below, such an invariant point can be advantageously determined to have a density corresponding to about the buoyant density of the nanotube composition(s) introduced thereto.

Upon sufficient centrifugation, at least one fraction of the medium or nanotube mixture can be separated from the medium, such fraction(s) as can be isopycnic at a position along the gradient. An isolated fraction can correspond to nanotubes produced by one or more techniques known in the art, identified by dimension or chemical characteristics corresponding thereto. Regardless, any such medium and/or nanotube fraction can be used, or optionally reintroduced to another fluid medium, for subsequent refinement or separation. Accordingly, such a method of this invention can comprise iterative separations. In certain embodiments, medium conditions or parameters can be maintained from one separation to another. In certain other embodiments, however, at least one iterative separation can comprise a change of one or more parameters, such as but not limited to the identity of the surface active component(s), medium identity, medium density gradient and/or medium pH with respect to one or more of the preceding separations.

In part, the present invention can also be directed to a method of separating single-walled carbon nanotubes by diameter. Such a method can comprise providing a fluid medium comprising a density gradient; contacting the medium and a composition comprising a mixture of single-walled carbon nanotubes varying by diameter, and at least one surface active component; centrifuging the medium and the composition for a time and/or at a rotational rate at least partially sufficient to separate the mixture along a gradient; and selectively separating by diameter at least one group or portion of the nanotube mixture from the medium. As demonstrated elsewhere herein, the nanotubes selectively separated can be identified spectrophotometrically and/or fluorimetrically, with such identification comprising comparison of absorbance and/or emission spectra respectively with a corresponding reference spectrum.

The nanotubes are of a diameter dimension increasing with gradient density and their position therealong. Those nanotubes selectively separated can comprise at least one chirality. Where such nanotubes comprise at least two chiralities, the selection can comprise iterative separation, as demonstrated elsewhere herein, to further partition the chiralities along a gradient. In so doing, at least one such separation can vary by change in surface active component, medium identity, medium density gradient, and/or medium pH, from one or more of the preceding separations.

In part, the present invention can also be directed to a system for separation of carbon nanotubes. Such a system can comprise a fluid density gradient medium, and a composition comprising at least one surface active component and carbon nanotubes comprising a range of chiralities and/or diameter dimensions, with the nanotubes positioned along the gradient of the medium. Diameter dimensions are limited only by synthetic techniques used in nanotube production. Without limitation, diameter dimension can range from less than or about 4 Å to about 7 Å, or to about 15 Å, or more. Likewise, the nanotubes in such a system are not limited by chirality. Without limitation, such chiralities can be selected from any one or combination discussed herein. Regardless, a fluid density gradient medium and one or more surface active components, with or without a co-surfactant, can be selected in view of the considerations discussed elsewhere herein.

In certain embodiments, the nanotubes of such a system can be selectively separated by diameter, such diameters as can correspond, by comparison using techniques described herein, to a respective manufacturing process and/or commercial source. Accordingly, carbon nanotubes separated in accordance with this invention (e.g., without limitation, single-walled nanotubes) can be of and identified by a diameter ranging from about 7 Å to about 15 Å. Without limitation, selectivity available through use of this invention can be indicated by separation of carbon nanotubes differing by diameters less than about 0.6 Å. As a further indication, the nanotubes within such a diameter range can be of substantially one (n,m) chirality or a mixture of (n,m) chiralities, where n and m denote chiral centers.

BRIEF DESCRIPTION OF THE DRAWINGS

FIG. 1. (A) Profile of the density gradient before and after centrifugation. During centrifugation, the iodixanol redistributed. (B-F) Sedimentation of SWNTs in a density gradient before and after 3.5, 7, 8.75, and 10.5 hours of ultracentrifugation. Initially, the nanotubes, starting at the top of the gradient, traveled downward towards higher densities with varying rates of sedimentation. After 7 hours the SWNTs began to converge to their corresponding isopycnic points in the gradient. Large aggregates and insoluble material were removed prior to separation by density. No pellet formed at the bottom of the centrifuge tube, in contrast with FIG. 2A. The initial concentration of SWNTs used for each part was adjusted such that the optical densities of the resulting distributions of SWNTs were similar. The concentration of SWNTs used for parts C and D was four and two times, respectively, of that used for that for parts B, E, and F.

FIG. 2. (A) Close-up photograph of the three regions of SWNTs observed after 10.5 hours of centrifugation. In this case, HiPCO-grown SWNTs are depicted. (i) Isolated SWNTs, which spilt into bands of different colors (1.11-1.17 g cm$^{-3}$). The observation of different colors strongly suggests that the SWNTs separated by physical or electronic structure. With increased ultrasonication time or strength during the preparation of the DNA wrapped SWNTs, the colored bands became darker and more concentrated. (ii) Grey, colorless, broad distribution of SWNTs at higher densities (>1.17 g cm$^{-3}$). (iii) Pellet of aggregates and insoluble material. When the aggregates and insoluble material are removed from the aqueous dispersions of nanotubes prior to separation, region iii does not form (as observed in FIG. 1). (B) Representative non-contact mode atomic force micrograph of SWNTs after isopycnic separation. SWNTs, grown by the HiPCO process, from the green colored band of (A) part i (fraction 70 from FIG. 3A) were deposited onto a freshly cleaved mica substrate. The nanotubes varied from 0.1-1 μm in length.

FIG. 3. Optical absorbance spectra of SWNTs after separation and fractionation. (A) and (B) depict spectra of fractions (as can be numbered consecutively from 1 starting with the lowest numbered fraction in each) from the colored bands using HiPCO and CoMoCAT-grown SWNTs, respectively. Absorbance due to optical transitions of semiconducting SWNTs at shorter wavelengths was maximized in the initial fractions at lower densities, while absorbance at longer wavelengths was maximized at larger densities. In (A), the first and corresponding second order optical transitions marked by (*), (#), and then (&) were maximized with increasing density. (C) The optical absorbance spectra of SWNTs (again as can be numbered by fraction) from the grey, uncolored region of the density gradient were red-shifted and broadened. In this case, HiPCO-grown SWNTs are depicted.

FIG. 4. Distribution of semiconducting SWNTs as a function of density after 10.5 hours of centrifugation at 174,000 g. (δp=0 corresponds to p=1.13±0.02 g cm$^{-3}$). (A) Amplitude of absorption as a function of density. Semiconducting SWNTs with first order optical transitions (as can be numbered consecutively from 1 from the shortest wavelength) at shorter (longer) wavelengths are distributed about smaller (larger) densities. (B) The density at which each distribution is maximized is plotted against the average diameter of the corresponding nanotubes from Table 1. The observed density monotonically increases with diameter such that the largest changes in density are observed between the nanotubes of the smallest diameters.

FIG. 5. Optical absorbance spectra of SWNTs produced by the CoMoCAT method before (dashed line) and after (solid line) selecting for SWNTs 7.6 Å in diameter using density gradient centrifugation. After separation, the concentrations of the (9, 1), (6, 5), and (8, 3) chiralities of SWNTs were enhanced (diameters 7.57, 7.57, 7.71 Å) whereas the concentrations of the (7, 5), (8, 4), (7, 6), (8, 6), (9, 5) and (8, 7) chiralities were not appreciably amplified (marked by asterisks).

FIG. 6. Structure of iodixanol—a compound used to provide density gradient medium for isopycnic separations of SWNTs.

FIG. 7. Photographs of the distribution of SWNTs in a layered 40/32.5/25% (w/v) iodixanol step gradient with the DNA wrapped SWNTs initially dispersed in the 32.5% (w/v) layer after 0, 3.5, 7, 8.75, and 10.5 hours of ultracentrifugation at 174,000 g. (This figure is an analog to FIG. 1B-F). Despite initially starting in the center of the density gradient, the DNA wrapped SWNTs still converged to the same density in the density gradient as in FIG. 1-2.

FIG. 8. (A) Optical absorbance spectra of CoMoCAT-grown SWNTs from the region of colored banding after separation and fractionation and (B) derivatives ($d\alpha/d\lambda$) of the same optical absorbance spectra. (Data in part A is identical to that presented in FIG. 3B). The maximum and minimum amplitude of the derivative (part B) about each peak in absorption due to first order optical transitions of semiconducting SWNTs (900-1340 nm) was used to determine the relative amplitude absorption. By using the derivative, the effects of the offset and the slowly varying background were minimized. (Again, the spectra can be numbered consecutively, beginning with the lowest numbered fraction.)

FIG. 9. Schematic for a simple model for determining the mass per volume of a hydrated and functionalized SWNT. D is the diameter of the nanotube, t is the thickness of the hydrated functionalization layer, $\rho_{ext}$ is the density of the hydrated functionalization layer, and $\rho_s$ is the sheet density of one graphene layer (the surface of the SWNT).

FIG. 10. (A) Optical absorbance spectra of SWNTs grown by the CoMoCAT method and dispersed in 2% w/v sodium cholate before separation in a density gradient. (B) Distribution after separation in a TLA100.3 rotor (determined using the derivative method[1]). (C) Spectra after separation in TLA100.3 rotor. (D) Spectra after separation in SW41 rotor. (E) Distribution after separation in a SW41 rotor (determined from a non-negative least squared fitting of the measured absorbance spectra using published values for the optical transitions of the (n,m) chiralities). (Again, the spectra in each figure can be numbered consecutively, beginning with the shortest wavelength or lowest fraction number.)

FIG. 15. Graphic plots showing the concentration of specific nanotube chiralities (as can be numbered from left) as a function of density within a gradient, upon separation, and data shifts with change of medium pH, surfactant and addition of co-surfactant.

FIG. 16. A photograph showing a density gradient of nanotubes prepared from laser ablation, and optical absorbance spectra (as can be numbered consecutively, from lowest fraction number) suggesting separation by corresponding electronic structure.

DETAILED DESCRIPTIONS OF CERTAIN EMBODIMENTS

Figure 11F:
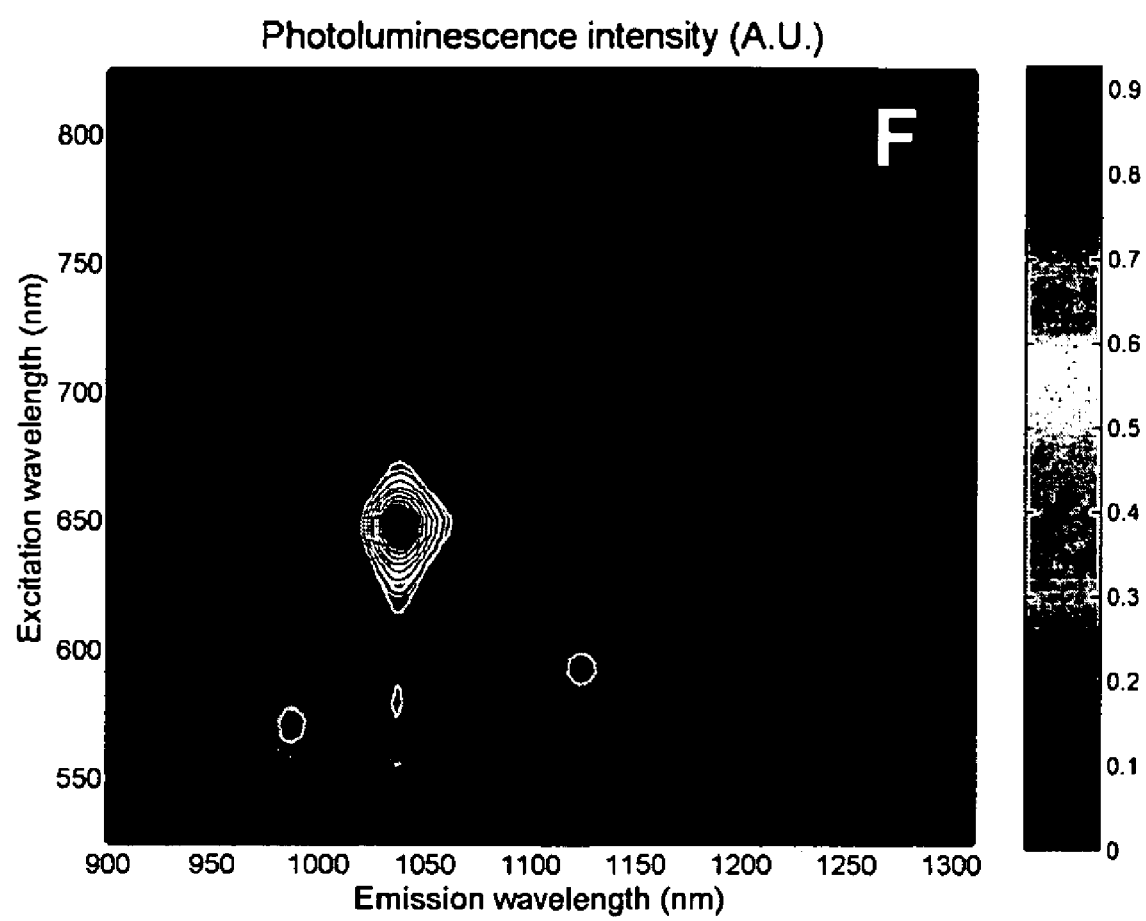
FIG. 11. (A and B) Optical absorbance spectra taken after iterative separations of two different fractions, showing spectral enhancement and improved separation; (C-F) fluorescence emission/excitation maps taken upon a series of iterative separations, showing improved chiral separation.

Illustrating certain embodiments of this invention, the work, isopycnic separation of SWNTs, by diameter and/or chirality, was demonstrated using density gradient ultracentrifugation. Benefits relate to the scalable nature and sensitivity of density gradient ultracentrifugation. As a further consideration, there is no covalent modification of the carbon nanotubes which can significantly degrade the electronic, optical, and mechanical properties unique to such a platform. The separation of representative SWNTs about 0.1-about 1 μm in length, a size-scale relevant for the creation of electronic and opto-electronic devices such as ambipolar field-effect transistors, was demonstrated, but isopycnic separation of longer nanotubes—by diameter and/or chirality—is also available since density gradient centrifugation has been shown in other unrelated fields to be increasingly efficient with higher molecular weights.

For the isolation of SWNTs, single-stranded DNA can be used as a surfactant due to its efficiency in dispersing SWNTs its stability in a density gradient medium such as aqueous solutions of iodixanol. DNA wrapped SWNTs were prepared following literature procedures, using nanotubes produced by either the HiPCO (high pressure carbon monoxide) or CoMoCAT (Co—Mo catalyst) processes. See, M. J. O'Connell et al., Science 297, 593 (2002); and S. M. Bachilo et al., J. Am. Chem. Soc. 125, 11186 (2003). Aqueous dilutions of iodixanol (Sigma-Aldrich, Inc.) were used as density gradient media and buffered to pH 8.5 (20 mM tris (hydroxymethyl) aminomethane). The initial density gradients were created by layering either 1.5 mL of 25% (p=1.14 g mL$^{-1}$) and 40% w/v (p=1.21 g mL$^{-1}$) or 1.0 mL of 25%, 32.5% (p=1.17 g mL$^-$), and 40% w/v iodixanol, and an approximately linear gradient was allowed to form via diffusion (see FIG. 1A). The nanotubes were either subsequently layered on top of the gradient after diffusion (FIG. 1B) or included in the 32.5% layer before diffusion (see FIG. 7). During the separation of the nanotubes, the iodixanol media also re-distributed, and the slope of the density gradient increased with time (FIG. 1A).

The sedimentation of the SWNTs in the density gradient at 174,000 g was monitored after 3, 7, 8.75, and 10.5 hours of ultracentrifugation (FIG. 1B-F). Initially the SWNTs traveled toward higher densities, and their spatial distribution broadened (FIG. 1B-C). Later, the sedimentation slowed and the SWNTs converged toward their respective isopycnic points in the gradient depending on their degree of isolation and physical structure (FIG. 1D-F). After 10.5 hours, the SWNTs had separated into three distinct groups.

FIG. 2A is a photograph of these three distinct groups, which also formed for the case in which the SWNTs were initially placed in the center of the gradient (see FIG. 7). The first grouping (1.11-1.17 g cm$^{-3}$) provided isolated nanotubes that had split into sharp bands of different colors. For HiPCO material, from small to large densities, these bands appeared purple, green, and then orange (FIG. 2A). For CoMoCAT material, these bands also formed, but in comparison, the top band was considerably darker than the others. For both materials, by increasing the strength or time of ultrasonication during the initial processing of the DNA wrapped SWNTs, these colored bands became darker and more concentrated. The SWNTs varied from about 0.1 to about 1 μm in length (FIG. 2B). The second grouping (>1.17 g cm$^{-3}$) was grey, colorless, and consisted of a broad distribution of SWNTs at larger densities (no banding). A pellet formed at the bottom of the centrifuge tube (FIG. 2A), as the last grouping, and did not form when the solutions of DNA wrapped nanotubes were first purified before centrifugation to remove large aggregates and insoluble material (FIG. 1B-F).

The formation of bands of different colors strongly suggested that the nanotubes were separating by electronic or physical structure. To more quantitatively characterize the separation of the DNA wrapped SWNTs, the gradients were fractionated after centrifugation into 25 μL fractions. The optical absorbance spectrum of each fraction was measured to characterize the distribution of different chiralities of semiconducting SWNTs as a function of density, specifically examining the first order optical transitions of semiconducting tubes ($E_{11s}$) in the range of 900-1340 nm, per the literature and for comparison to literature values. (Optical absorbance spectra are less well suited for the characterization of metallic nanotubes, which typically have broader transitions at higher energies in the violet and ultraviolet). For fractions from the region containing the colored bands, the relative magnitude of absorption from different semiconducting chiralities varied with density (FIG. 3A-B). At smaller densities within this region, the magnitude of absorption from and the concentration of nanotubes with first order optical transitions at shorter wavelengths were enhanced. This enhancement shifted to longer wavelengths with increasing density.

In contrast, in the second, colorless grouping, the magnitude of absorption from different semiconducting chiralities did not vary with density. Instead, in this region of the density gradient, the peaks in the optical absorbance spectra due to first order transitions shifted to lower energies and broadened (FIG. 3C). To ensure that the observed red-shift and broadening were not effects of increased iodixanol concentrations, the invariance of the optical absorbance spectra of isolated SWNTs was confirmed in solutions up to 60% w/v Iodixanol ($\rho$=1.32 g mL$^{-1}$).

The distribution of nanotubes of different diameters as a function of density in the gradient after 10.5 hours of centrifugation was quantified using six peaks in optical absorbance corresponding to the $E_{11s}$ transitions. In FIG. 4A, with reference to Example 4, the amplitude of each peak in absorption is plotted against density. Each distribution is centered about an average density, which shifts to higher densities with increasing wavelength. For SWNTs produced by the CoMoCAT method and consistent with the literature, each of these peaks in absorption predominately corresponds to either one or two chiralities of tubes (Table 1, below).

TABLE 1

Assignment of near IR absorption peaks.

| $\lambda_{11s}$ (nm) | Chiralities | Diameters (Å) |
|---|---|---|
| 929 | (9, 1) | 7.57 |
| 991 | (6, 5), (8, 3) | 7.57, 7.71 |
| 1040 | (7, 5) | 8.29 |
| 1134 | (8, 4), (7, 6) | 8.40, 8.95 |
| 1199 | (8, 6) | 9.66 |
| 1273 | (9, 5), (8, 7) | 9.76, 10.32 |

Each of the six peaks in optical absorption in the near IR for isolated, DNA wrapped SWNTs produced by the CoMoCAT method are assigned to resonant, first order optical transitions from predominately either one or two chiralities of semiconducting SWNTs. See, S. M. Bachilo, L. Balzano, J. E. Herrera, F. Pompeo, D. E. Resasco, and R. B. Weisman, J. Am. Chem. Soc., 125, 11186-11187 (2003).

In FIG. 4B, the average density is plotted against the average diameter for each one of these peaks. The average density monotonically increases with diameter with the largest changes in density occurring at the smallest diameters. Three of the six optical transitions listed in Table 1 originate from two different chiralities of nanotubes. To account for the error resulting from the possible variation in the line-shape of these double peaks, an error bar has been included in the diameter-dimension of FIG. 4B spanning the difference in diameters of the two chiralities.

Separation of particles in a density gradient can result from variations in sedimentation coefficients or buoyant densities. In this case, the organization of SWNTs into colored bands was not observed for short centrifugation times when the differences in sedimentation velocities among nanotubes were the most significant (FIG. 1C), and it can be concluded that the separation by diameter was driven by differences in buoyant density rather than sedimentation coefficient. (Understanding that a correlated length dependence has been shown using other separation techniques in the art, atomic force microscopy was used to characterize nanotubes isolated from several fractions. See, Example 17. Length dependence was not observed, supporting variations in buoyant density as direct results of differences in nanotube diameter.) Using a simple, geometric model treating a nanotube as an unwrapped, hollow cylinder, the intrinsic mass per volume of a nanotube is expected to vary inversely with diameter, D, as 3.1 D$^{-1}$ g cm$^{-3}$ nm. (See, Example 5.) The inverse relationship with diameter is the opposite of what was experimentally observed, grossly overestimates density, and underscores the large influence of the negatively charged, highly hydrated, sugar-phosphate backbone of single-stranded DNA. Without limitation to any one theory or mode of operation, by including an encapsulating layer of constant thickness (~2-3 nm) representing hydrated DNA, the buoyant density of a DNA-SWNT complex reduces to the experimentally observed magnitude (1.11-1.17 g cm$^{-3}$), and a more accurate trend of increasing density with diameter is produced. Again, without limitation, such a trend can be qualitatively understood by considering the ratio of the volume of an external encapsulating layer, constant in thickness, to the volume of a bare nanotube declines with increasing nanotube diameter. Accordingly, nanotubes with larger diameters are relatively less hydrated than smaller ones.

The SWNTs in the grey, colorless region may be aggregated into bundles or isolated but wrapped by less DNA than those forming the colored bands. Bundles of SWNTs are expected to sediment to larger buoyant densities than individual nanotubes because of diminished surface-to-volume ratios, reducing the effects of the bound hydration at the nanotube-water interface. Less DNA coverage would reduce the bound hydration, also resulting in larger buoyant densities. The optical transitions of SWNTs in bundles are expected to red-shift and broaden due to electron-delocalization and fast non-radiative recombination in the metallic portion of bundles. Similarly, a red-shift and broadening are also expected in the case of reduced DNA coverage due to the enhanced accessibility of highly polar, unbound water to the nanotube surface. Consequently, both reduced DNA coverage and SWNT aggregation are plausible explanations for the optical absorbance spectra shown in FIG. 3C.

From FIG. 4B, density gradient centrifugation appears to be the most effective in separating nanotubes of smaller diameters, such as those grown by the CoMoCAT method, which produces fewer chiralities of nanotubes, which are, on average, smaller in diameter (8 Å). FIG. 5 compares the absorbance spectrum of SWNTs produced by the CoMoCAT method. After separation, a narrow distribution of SWNTs close to 7.6 Å in diameter, of primarily the (9, 1), (6, 5), and (8, 3) chiralities (diameters 7.57 Å, 7.57 Å, 7.82 Å), was enhanced. As depicted in FIG. 5, the amplitudes of absorbance at 929 and 991 nm were enhanced by factors of 5.3 and 3.5, respectively, following separation. In contrast, the concentrations of chiralities of nanotubes with larger diameters, specifically the (7, 5), (8, 4), (7, 6), (8, 6), (9, 5) and (8, 7) chiralities, were appreciably less amplified. This enhancement and specifically the separation between the (6, 5) and (7, 5) chiralities, whose diameters differ by only 0.7 Å, demonstrate the high selectivity of density gradient centrifugation.

As understood by those in the art, aqueous iodixanol is a common, widely used non-ionic density gradient medium. However, other media can be used with good effect, as would also be understood by those individuals. More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the carbon nanotubes, whether or not functionalized, should also be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the particular carbon nanotubes for a particular medium.

Accordingly, with respect to this invention, any density gradient medium can be used providing the single-walled carbon nanotubes are stable; that is, do not aggregate to an extent precluding useful separation. Alternatives to iodixanol include but are not limited to inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as but not limited to percoll).

One such medium was shown to be less than completely satisfactory, at least under the particular conditions examined, but illustrates one consideration for choice of a suitable density gradient medium. For instance, separation of DNA-wrapped single-walled carbon nanotubes was attempted in an aqueous density gradient medium comprising iodixanol and CsCl. However, under the particular conditions employed, the nanotubes were observed to be aggregated, presumably because of an electrostatic screening effect induced by a relatively large concentrations of cesium and chloride ions. In contrast, no aggregation was observed using the non-ionic iodixanol, alone.

Notwithstanding the preceding and other results described herein, the methods of this invention can be extended to include use of ionic density gradient media. However, even if the nanotubes are stable, such media typically have large water affinities and osmolalities, which can result in dehydration of the nanotubes and their associated surface active components, and may lead to larger effective buoyant densities which may or may not affect separation.

Other parameters which can be considered upon choice of a suitable density gradient medium include, without limitation, diffusion coefficient and sedimentation coefficient, both of which can determine how quickly a gradient redistributes during ultracentrifugation. Generally, for more shallow gradients, larger diffusion and smaller sedimentation coefficients are desired. For instance, percoll is a non-ionic density gradient medium, having a relatively small water affinity compared to other media. However, it has a large sedimentation rate and a small diffusion coefficient, resulting in quick redistribution and steep gradients. While cost can be another consideration, the methods of this invention tend to mitigate such concerns in that media can be repeatedly recycled and reused. For instance, while aqueous iodixanol is relatively expensive as compared to other density gradient media, it can be recycled, with the iodixanol efficiently recovered at high yield, for reuse in one separation system after another.

Density gradient ultracentrifugation was also used with comparable effect for the separation of other surfactant-encapsulated SWNTs. Because many surfactants cost orders of magnitude less than single-stranded DNA, such a variation can be economically advantageous. The difference is significant when comparing, for instance, sodium cholate (98% purity) from Sigma-Aldrich (St. Louis, Mo.) on a 100 g scale, quoted at $0.62/g, with single-stranded DNA of sequence $d(GT)_{20}$ produced on the largest scale offered (150 mg scale, much less than 98% purity) by Alpha-DNA (Montreal, Canada) at $2242.80/g. Successful separation by the present method(s) has been achieved using surfactants such as salts of cholic acid, including sodium cholate, sodium deoxycholate, and sodium taurodeoxycholate. Separation in density gradients is also achieved using other surfactants, as would be known to those skilled in the art made aware of this invention.

In other embodiments, such as separations of chiralities, density gradient centrifugation can involve multiple iterations, whereby the degree of separation by physical and electronic structure can improve with each iteration. For instance, removal of undesired chiralities can be effected by successively repetitive density gradient centrifugation. Additionally, the surfactant encapsulating the SWNTs can be modified or changed between iterations, allowing for even further refinement of separation, as the relationship between density and the physical and electronic structure will vary as a function of the surfactant/encapsulation layer.

Illustrating this invention, the separation of DNA wrapped SWNTs by diameter was demonstrated using density gradients of iodixanol. Isolated DNA wrapped SWNTs separated into colored bands (1.11-1.17 g $cm^{-3}$) in the density gradient during centrifugation. In a trend that is the opposite of that expected for non-functionalized SWNTs, the measured density of the DNA wrapped SWNTs increased with increasing nanotube diameter. This method has been successfully applied to 0.1-1 μm long nanotubes grown by both the HiPCO and CoMoCAT methods, and can likely be applied to separate other nanostructures in which external functionalization or relative hydration of the surfaces varies with size. The separation of SWNTs by diameter using density gradient ultracentrifugation is a highly scalable and automatable process, which uses equipment already employed in separating aggregated and isolated SWNTs. This method (possibly used in series with other techniques for separation) is expected to impact the fields of molecular electronics, opto-electronics, and biological sensing, where populations of nanotubes mono-disperse in diameter, chirality, and electronic band gap will be necessary to create large quantities of nanotube-based devices.

EXAMPLES OF THE INVENTION

The following non-limiting examples and data illustrate various aspects and features relating to the methods and/or systems of the present invention, including the preparation and use of density gradient media for carbon nanotube separation, confirmation of which is available using spectroscopic techniques of the sort described herein. In comparison with the prior art, the present methods and systems provide results and data which are surprising, unexpected and contrary thereto. While the utility of this invention is illustrated through the use of several methods and the density gradient media and surface active components which can be used therewith, it will be understood by those skilled in the art that comparable results are obtainable with various other media and surface active components, as are commensurate with the scope of this invention.

Example 1

Isolation of SWNTs. In a modification of a known literature method, 1 mg of raw SWNTs was dispersed in aqueous solutions of 0.1 M NaCl and 1 mg mL$^{-1}$ single-stranded DNA. (See, also Zheng; M., Jagota, A.; Strano, M. S; Santos, A. P.; Barone, P.; Chou, S. G., Diner, B. A; Dresselhaus, M. S.; McLean, R. S.; Onoa, G. B; Samsonidze, G. G.; Semke, E. D.; Usrey, M.; Walls, D. J. *Science* 2003, 302, 1545-1548, incorporated herein by reference in its entirety.) Raw SWNTs produced by the HiPCO and CoMoCAT methods were purchased from Carbon Nanotechnologies, Inc. and Southwest Nanotechnologies, Inc., respectively. Single-stranded DNA (GT)$_{20}$ purified by standard desalting was purchased from Alpha DNA (Ontario, Canada). Aggregations and bundles of SWNTs were disrupted using a bath ultrasonicator (Model 3510, Branson) or a horn ultrasonicator coupled to a tapered extension, which was immersed into solution (Sonic Dismembrator 550, Fisher Scientific). Bath and horn ultrasonication times ranged from 0 to 90 minutes. After ultrasonication, either 40 μL or 439 μL of 1 mg mL$^{-1}$ solution was separated in a density gradient for the purpose of capturing digital images of the colored separations or for the fractionation and subsequent characterization of the optical absorbance spectra, respectively.

Example 2

Diffusion of density gradients. After the layering the different iodixanol (FIG. 6) dilutions, the centrifuge tubes were tilted to ~85 degrees for 60 minutes to enable an approximately linear gradient to form via diffusion.

Example 3

Fractionation of density gradients. After ultracentrifugation, the gradients were fractionated by an upward displacement technique using a modified Beckman fraction recovery system. (J. M. Graham, *Biological centrifugation* (BIOS Scientific Publishers, Limited, ebrary, Inc., 2001), pp. 210) Fluorinert FC-40 (p~1.85 g mL$^{-1}$, Sigma-Aldrich, Inc.) was used as a water-immiscible displacement medium, which was introduced to the bottom of the centrifuge tube by a motor controlled syringe pump (PHD 2000, Harvard Apparatus, Inc.) at a speed of 0.5 mL min$^{-1}$ through a 22-gauge stainless-steel tube in steps of 25 or 100 μL. To measure the density profile of a density gradient, 100 μL fractions were collected, and the density of each fraction was measured within an error ±1% by massing a known volume of each fraction using a calibrated micro-pipette and an electronic balance. To measure the optical absorbance spectra of SWNTs in a density gradient as a function of position in the gradient, the density gradient was parsed into 25 μL fractions. Each fraction was numbered from the top of the gradient downward with the first gradient numbered f1. After parsing, each 25 μL fraction was diluted to a volume of 850 μL for the measurement of optical absorbance spectra using a Cary 500 spectrophotometer in the visible and near IR (Varian, Inc.).

As would be understood by those skilled in the art, various other fractionation techniques can be used, after centrifugation while preserving nanotube separation. Such techniques include aspiration (from meniscus or dense end first), upward displacement, tube puncture, tube slicing, cross-linking of gradient and subsequent extraction, and piston fractionation.

Example 4

Background subtraction. To subtract the effects of the slowly varying background absorption from the measured optical absorption spectra, the derivative of the measured optical absorption with respect to wavelength was used (FIG. 8), and two assumptions were made. First, it was assumed that the line-shape of a first order optical transition of a SWNT is invariant with respect to concentration, as expected from Beer's law. An invariant line-shape implies that the derivative will be directly proportional to the amplitude of absorption. In this case, the relative amplitude of absorption can be measured using the derivative. Second, it was assumed that the background absorption (from residual carbonaceous impurities, the tail of π-plasmon resonances, and off-resonance, neighboring absorbance peaks) was slowly varying with respect to wavelength in comparison with the variation near a first order, optical transition. (J. S. Lauret et al., *Phys. Rev. Lett.* 90 (20.03). T. Hertel, R. Fasel, G. Moos, *Appl. Phys. A* 75, 449 (2002). R. Saito, H. Kataura, *Topics in Applied Physics* 80, 213 (2001)) This is a reasonable assumption because the line-width of a first order, optical transition of an isolated, semiconducting SWNT has been measured to be relatively narrow—about 25 meV. (M. J. O'Connell et al., *Science* 297, 593 (Jul. 26, 2002). M. S. Arnold, J. E. Sharping, S. I. Stupp, P. Kumar, M. C. Hersam, *Nano Lett.* 3, 1549 (2003). M. S. Arnold et al., *Proc. of SPIE* 5359, 376 (2004)) Furthermore, the spacing between the six transitions studied here is significantly greater than 25 meV (Table 1). A slowly varying background implies that the derivative of the background absorption is sufficiently small and can be ignored. To further eliminate small linear variations of the background absorbance with respect to wavelength, the maximum absolute value of the derivative to the right and left of each peak in optical absorption were averaged. This averaged value as the amplitude of absorbance is provided in FIG. 4.

Example 5

Buoyant density models. A simple model describing the buoyant density of SWNTs is as presented above and further explained in more detail here (see also, FIG. 9). The mass of a SWNT of diameter, D, can be given as the surface area times the sheet density of graphene, $\rho_s$. To account for the DNA wrapping and associated hydration, an external layer of constant thickness, t, and density, $\rho_{ext}$, is included. Accordingly, the mass per volume of a wrapped and hydrated nanotube is given by:

$$\rho_{NT} := \frac{\rho_s \pi D + \rho_{ext}\pi\left(\left(\frac{D}{2}+t\right)^2 - \frac{D^2}{4}\right)}{\pi\left(\frac{D}{2}+t\right)^2}.$$

For a SWNT in vacuum (t=0, $\rho_{ext}$=0), this expression simplifies to $$\rho_{NT} := \frac{4\rho_s}{D}$$

such that the buoyant density is inversely proportional to diameter. Under this simplification, the buoyant density decreases with increasing diameter, which contradicts our experimental observation. More so, for a graphene sheet with an expected $\rho_s$ of $7.663\times10^{-8}$ g cm$^{-2}$, the buoyant density then is given by 3.1 D$^{-3}$ g cm$^{-3}$ nm, which significantly overestimates the measured values for SWNT density.

By accounting for a DNA wrapping and hydration layer, the buoyant density reduces to the experimentally observed magnitude. Assuming a buoyant density of 1.15 g cm$^{-3}$ for a DNA wrapped and hydrated SWNT and an upper bound of 1.12 g cm$^{-3}$ for $\rho_{ext}$—the measured buoyant density of free DNA in iodixanol (S2)—implies an external thickness, t, of 3 nm. However, because the single-stranded DNA is forced into an extended conformation on the surface of high aspect ratio SWNTs, smaller $\rho_{ext}$ could be reasonable. Assuming a $\rho_{ext}$ of 1.08 g cm$^{-3}$, t reduces to 2 nm. Furthermore, by including this external, hydrated layer, the observed trend of increasing buoyant density with increasing diameter is also matched for SWNTs with diameters within the range of those used in our experiments (0.76-1.03 nm—Table 1). The derivative of buoyant density with respect to diameter is given by:

$$-\frac{4(D\rho_s - 2\rho_s t + \rho_{ext}Dt)}{(D+2t)^3}.$$

Thus, the buoyant density increases with increasing diameter up to a critical diameter, $D_{max}$, given by:

$$\frac{2\rho_s t}{\rho_s + \rho_{ext}t}$$

For a $\rho_s$ of $7.663\times10^{-8}$ g cm$^{-2}$, $\rho_{ext}$ of 1.08 g cm$^{-3}$, and t of 2 nm, expect a $D_{max}$ of 1.11 nm. For a $\rho_{ext}$ of 1.12 g cm$^{-3}$, and t of 3 nm, expect a smaller $D_{max}$ of 1.05 nm.

Example 6

Demonstrating use of cholate surfactants, single-walled carbon nanotubes were dispersed at concentrations of up to 1 mg per mL in 1-5% weight per volume solutions of these surfactants via ultrasonication. Insoluble material and coarse aggregates were then removed by ultracentrifugation at 54 krpm in a Beckman-Coulter TLA100.3 rotor for 14 minutes at 22 degrees Celsius. After this ultracentrifugation, the supernatant was decanted and saved for separation in density gradients.

In principle, any rotor geometry can be used to implement density gradient centrifugation, but two specific types of centrifuge rotors were used, with good effect, for the separation of surfactant encapsulated SWNTs. The first type of centrifuge rotor was a fixed angle Beckman-Coulter TLA100.3 rotor and the second was Beckman-Coulter SW41 swing-bucket rotor. Density gradients were formed by layering solutions of different densities directly into a centrifuge tube and waiting for the gradient to diffuse into a roughly linear spatial distribution. The individual layers were formed by mixing surfactant solutions and density gradient media at various ratios and in some cases each layer was buffered at constant pH. Optiprep (60% w/v iodixanol in water) was used as the density gradient medium. SWNTs encapsulated by surfactants were mixed into at least one layer so that they could be incorporated into the density gradient.

Successful separation of sodium cholate, sodium deoxycholate, and sodium taurodeoxycholate encapsulated SWNTs was demonstrated in the TLA100.3 rotor. Gradients for the TLA100.3 rotor were formed from 3 layers, each 1 mL in volume. From bottom to top, the gradients were 40%, 20%, and then 5% weight per volume iodixanol. SWNTs encapsulated by surfactants were included in either the 20% or 5% weight per volume layers. Diffusion for 1 hour while tilting the centrifuge tubes at ~75 degrees from vertical resulted in a roughly linear density gradient before centrifugation. After centrifugation at 22 degrees Celsius for 9 hours at 64 krpm, the centrifuge tubes were fractionated using an upward displacement technique using a Beckman conical cap, as described above for DNA wrapped SWNTs.

Successful separation of sodium cholate encapsulated SWNTs was also demonstrated in SW41 centrifuge rotors. Gradients for the SW41 rotor were formed from 6 layers, each variable in volume and iodixanol concentration. Two slightly different gradients were implemented. In the first type of gradient, layers from top to bottom 2.185, 2.185, 2.185, 0.875, 1.785, and 1.785 mL in volume of 10.62, 14.00, 17.36, 19.72, 21.77, and 24.52% w/v iodixanol were used. The sodium cholate encapsulated SWNTs were included in the layer that is 0.875 mL in volume. In the second type of gradient, layers from top to bottom of 2.535, 2.535, 2.535, 0.875, 1.260, and 1.260 mL in volume of 10.89, 14.79, 18.69, 21.31, 22.96, 24.9% w/v iodixanol were used. Again, the sodium cholate encapsulated SWNTs were included in the layer that is 0.875 mL in volume. After layering, the tubes were left standing vertically for 18 hours until the spatial distribution of iodixanol was roughly linear. After centrifugation at 22 degrees Celsius for 24.5 hours at 40 krpm, the centrifuge tubes were fractionated using a Piston Gradient Fractionator (Model 152, BioComp Instruments, Inc.; New Brunswick, Canada).

Similar separation by electronic and physical structure was observed for both gradients (See FIG. 10). Separation is available over a wide range of gradient media, slopes, density offsets, centrifugation speeds, centrifugation temperatures, and initial spatial positions of the carbon nanotubes in the gradient.

After fractionation, the separation by physical and electronic structure is analyzed by measuring the optical properties of the separated fractions. The collected fractions are diluted to a volume of 0.8-1.0 mL and studied using optical spectrophotometry or fluorimetery, as described elsewhere herein.

Example 7

The results of this example successfully demonstrate the improved separation of SWNTs by physical and electronic structure upon multiple iterations of ultracentrifugation. SWNTs were encapsulated by sodium cholate, and multiple iterations were demonstrated in both TLA100.3 and SW41 rotors. After one iteration of separation, as described above, specific fractions of carbon nanotubes enriched by their physical and electronic structure were included in a second density gradient, identical to the first gradient. The same parameters for centrifugation and fractionation were used in the second iteration. With reference to FIG. 11A-B, separation improved in each of 2 iterations, demonstrating that this process can be repeated for as many iterations as desired for a particular separation or refinement.

More specifically, with reference to FIGS. 11A and B, the optical absorbance spectra was taken after a second iteration of separation in a TLA100.3 rotor. The absorbance spectrum of the initial CoMoCAT material before the first iteration is depicted in FIG. 10A. Two different fractions (f16 and f20) after one iteration of separation are depicted in FIG. 10C. The fraction f16 after one iteration was then further purified in a second density gradient. The resulting improved spectrum is depicted in FIG. 11A. In (A), the nanotubes with the smallest diameters such as the (6,5) chirality are further enhanced in concentration while larger diameter nanotubes with their first order optical transitions at larger wavelengths are reduced in concentration. Additionally, the fraction f20 after one iteration of centrifugation in a density gradient was further purified in a second density gradient. The resulting improved spectrum is depicted in FIG. 11B. In (B), the (6, 5) chirality—dominant in the original CoMoCAT material—has been mostly removed while chiralities at larger diameters have been enhanced.

Fluorescence emission/excitation maps of SWNTs produced by the CoMoCAT method and dispersed by sodium cholate after separation in a density gradient using a SW41 rotor are shown in FIGS. 11C-F: (C) Initial CoMoCAT material. (D) After one iteration of separation, selecting for SWNTs that are of diameter comparable to the (6, 5) chirality (7.6 angstroms). (E) After the second iteration of separation, again selecting for the (6,5) chirality. In this figure, it is apparent that the (6,5) chirality (7.6 angstroms) is dominant. The (7,5) chirality has been nearly completely suppressed (8.2 angstroms). Still apparent are the (8,3) chirality (7.7 angstroms) and the (9,2) chirality (8.0 angstroms). (F) After second iteration of separation to the material depicted in (D), selecting for the (7,5) chirality in the second iteration. The fractions depicted in (E) and (F) originated from the same density gradient, but fraction (F) was collected was at a larger density than (E). In (F), the (7,5) chirality is dominant. Further iterations of density gradient ultracentrifugation should enable improved separation.

Example 8

To improve the quality of separation by physical and electronic structure after one iteration, shallower density gradients were employed. During ultracentrifugation, iodixanol gradients become steeper with time as the iodixanol redistributes toward the bottom of the centrifuge tube in the centrifugal field. To achieve shallower density gradients than possible with the TLA100.3 rotors, longer centrifuge tubes and a SW41 rotor were used. The slope of the density gradient at the center (halfway between the bottom and top) of a SW41 centrifuge tube will remain relatively unchanged for up to 30 hours of ultracentrifugation at 22 degrees Celsius at 40 krpm (FIG. 12). The difference in the quality of separation by physical and electronic structure when using SW41 and TLA 100.3 centrifuge tubes is demonstrated in FIG. 10D and FIG. 10C, respectively.

Figure 12A:
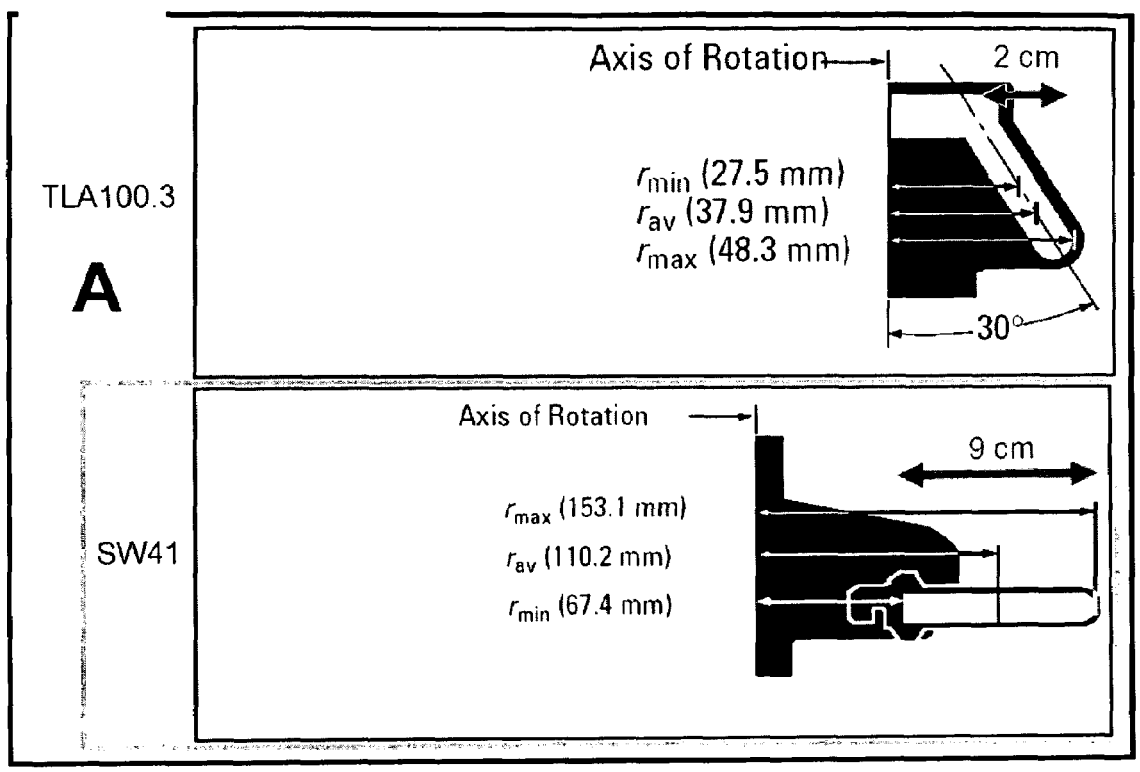
FIG. 12. Representative rotor product geometries (A) and associated experimental data (B) illustrating redistribution of density gradient media. (Again, the plots can be numbered consecutively, beginning with the shortest duration, etc.)
Figure 12:
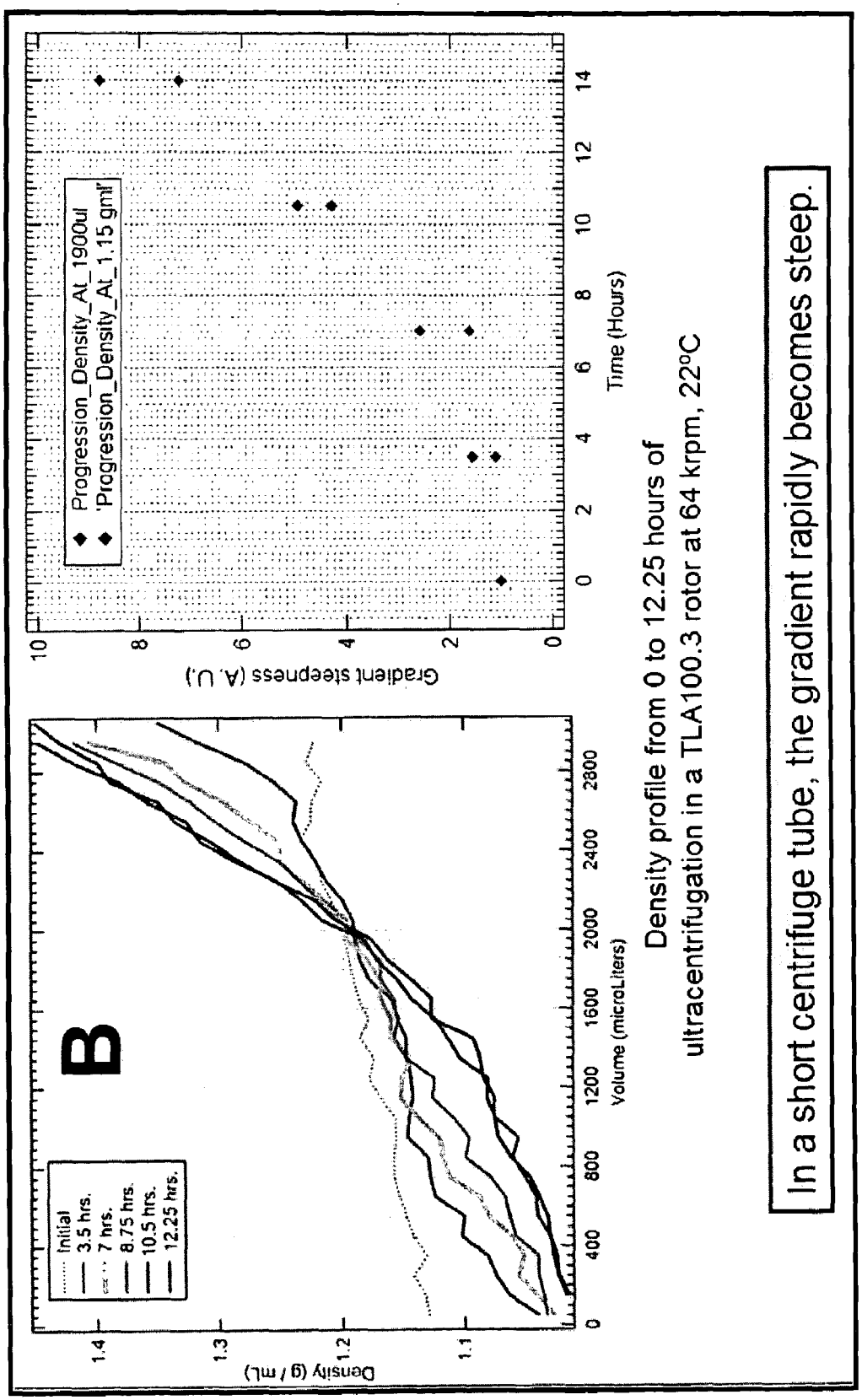
Figure 12C:
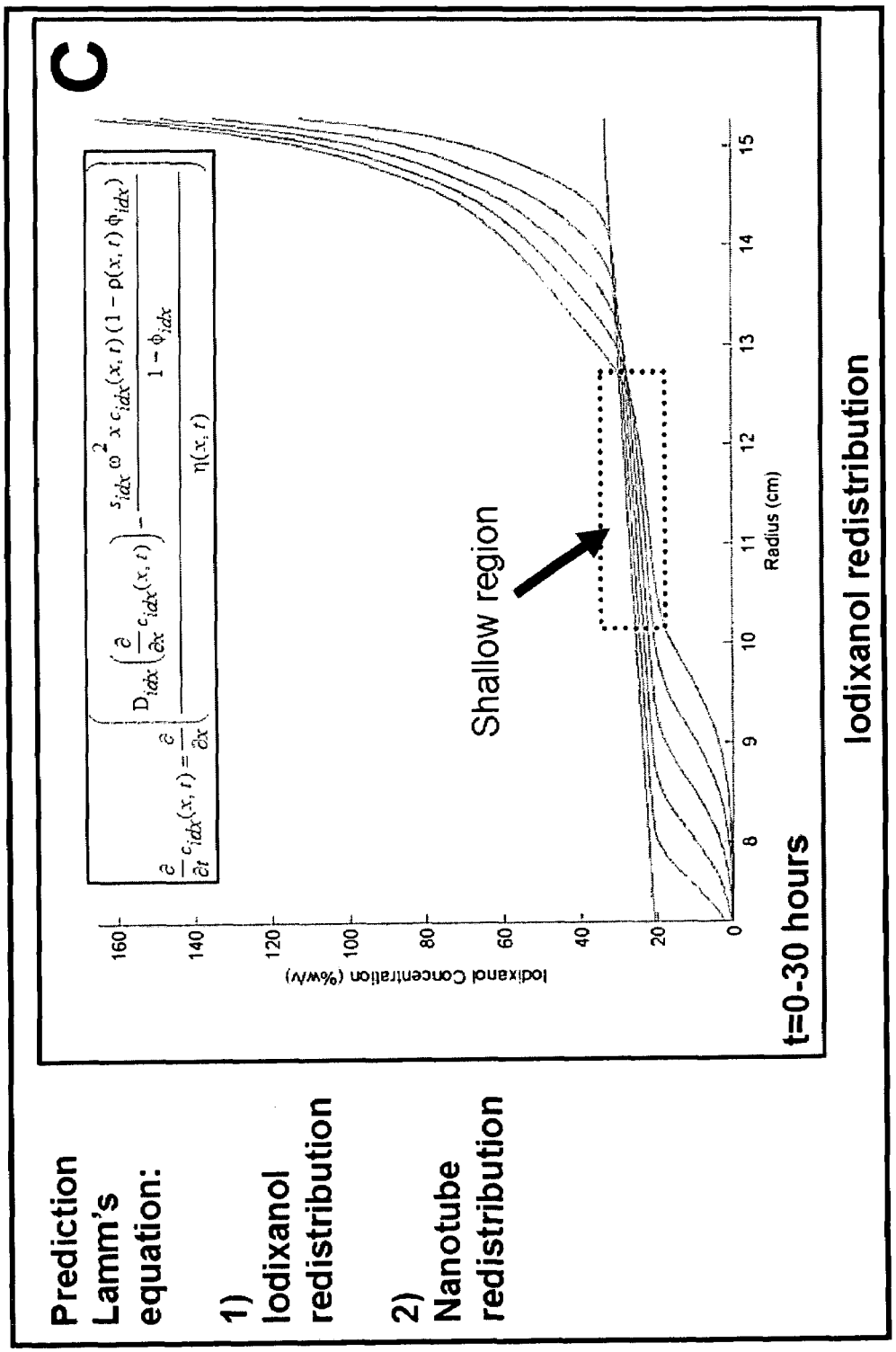

Representative rotor geometries are shown in FIG. 12A, as commercially available from Beckman. FIG. 12B shows experimental data quantifying the redistribution of iodixanol during ultracentrifugation in a TLA100.3 rotor. The steepness of the density gradient increases at all spatial positions within the first 3.5 hours of ultracentrifugation. Predictions of iodixanol redistribution for 0, 6, 12, 18, 24, and 30 hours of ultracentrifugation at 40 krpm, 22 degrees Celsius is shown in FIG. 12C. A region of the density gradient in the center of the centrifuge tube remains shallow (marked by a box and labeled in figure). (Lamm's equation was numerically solved for this prediction. The parameters D_idx, s_idx, and phi_idx corresponding to the diffusion coefficient, the sedimentation coefficient, and the specific volume of iodixanol, respectively, were determined using a Beckman XL-A ultracentrifuge. The viscosity of iodixanol (eta) was a function of the iodixanol concentration and the relationship between viscosity and concentration was determined from viscosity data included with the product information for Optiprep from the manufacturer.) Examples of improved separation using a SW41 rotor compared with a TLA 100.3 rotor are depicted in FIGS. 10D and 10C, respectively.

Example 9

Figure 13A:
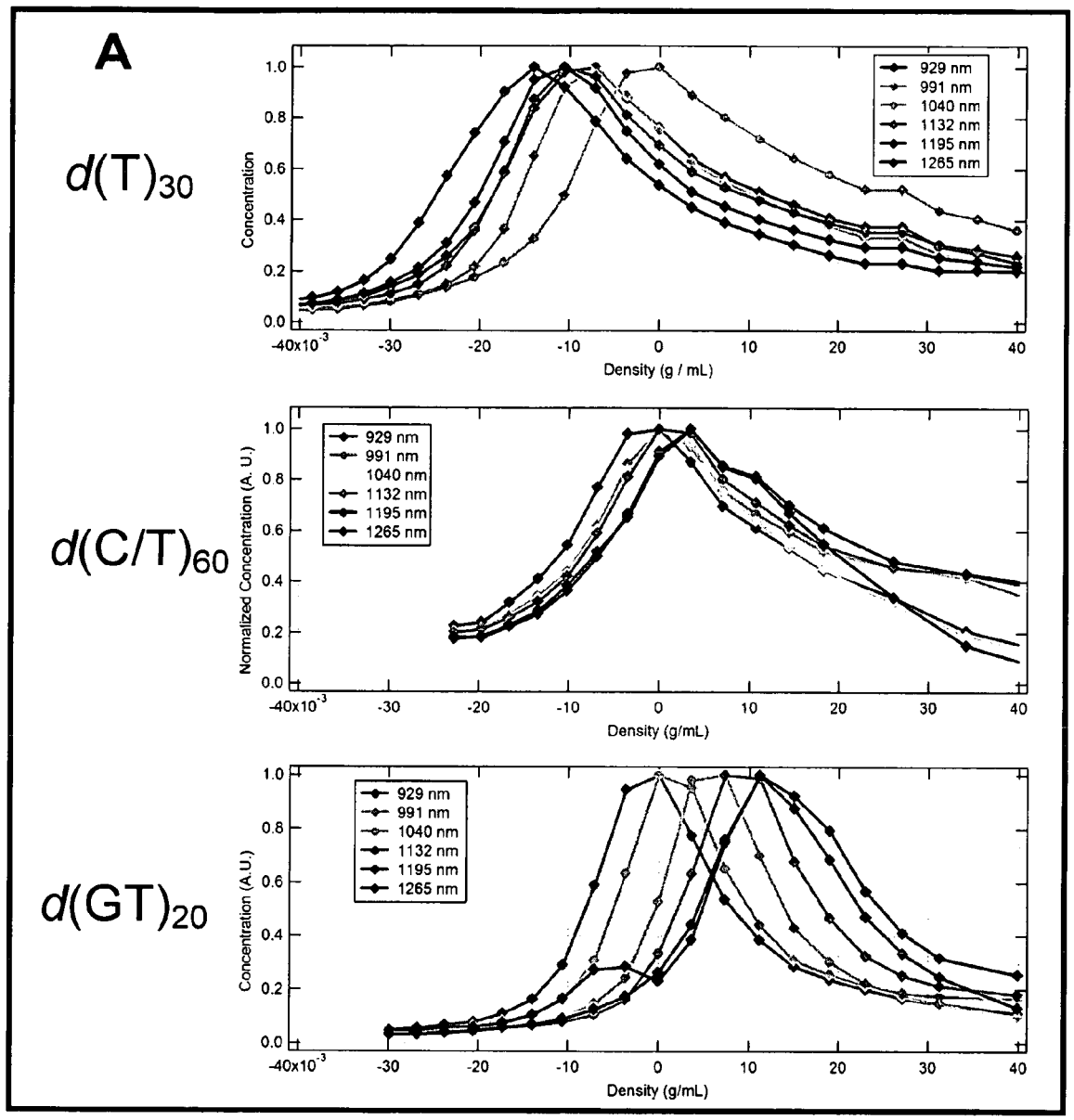
FIG. 13. (A) Separation by electronic and physical structure of DNA wrapped SWNTs in a density gradient using a TLA100.3 rotor and procedures. The separation quality decreases when using $d(T)_{30}$ and $d(C/T)_{60}$ single-stranded DNA compared with $(GT)_{20}$. (B) Separation when using $d(GT)n$ where n=5, 10, 20, 30. Separation is best when n=30 and decreases in quality as n decreases. (Again spectra can be numbered consecutively, from lowest wavelength.)
Figure 13B:
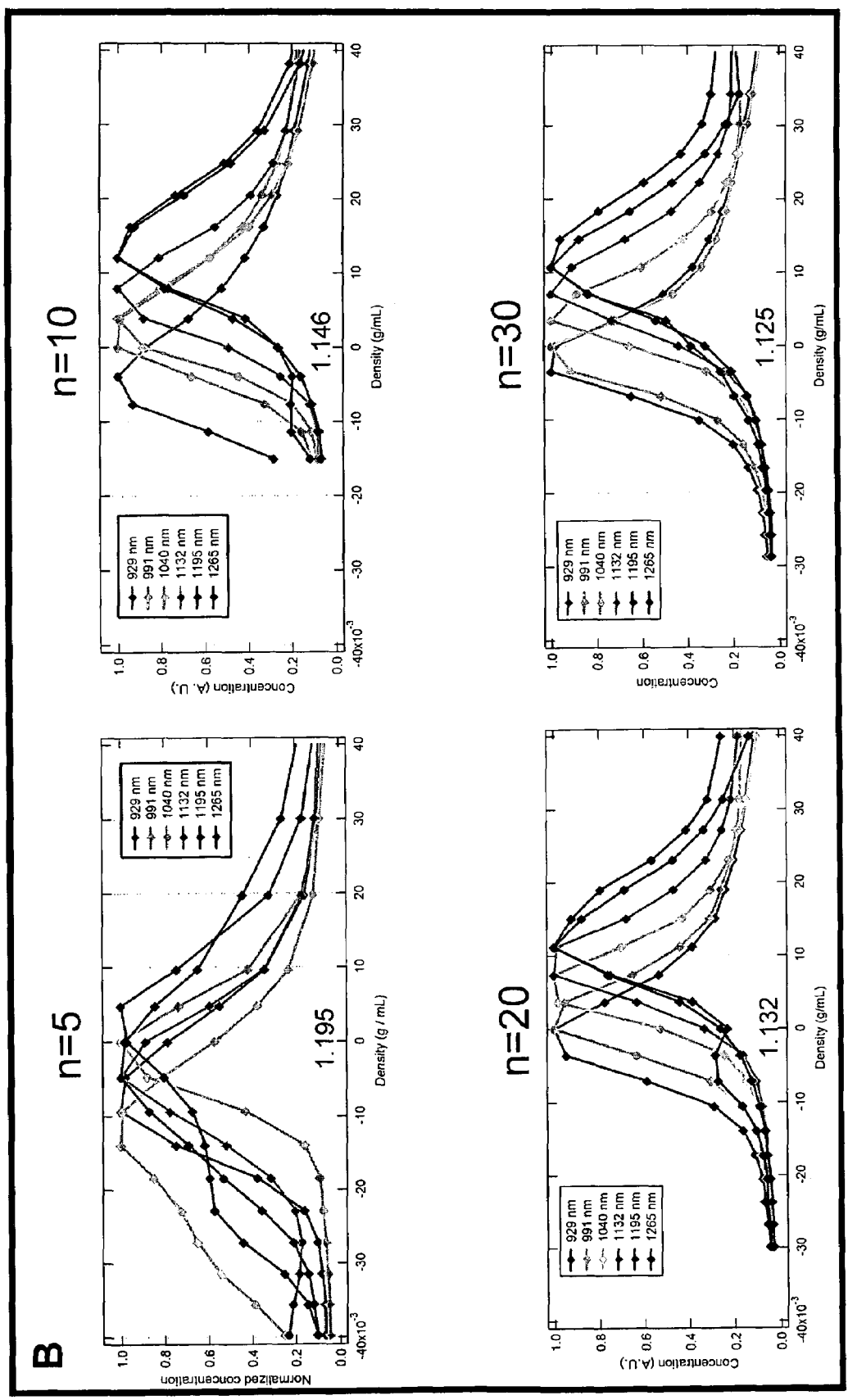

By varying the DNA strand used to wrap SWNTs, the separation by physical and electronic structure in density gradients can be affected. As described above, single-stranded DNA sequence of $d(GT)_{20}$ can be used, in addition to $d(T)_{30}$ and $d(C/T)_{60}$ where C/T denotes a random sequence of either C or T for each base, where each strand in the synthesized ensemble is randomly different. In both cases the quality of separation decreased when compared with $d(GT)_{20}$ (FIG. 13A). Different lengths of $d(GT)_n$, where n=5, 10, 20, or 30, were also examined. Optimal separation by physical and electronic structure was observed for n=30 and the separation quality declined with decreasing n (FIG. 13B), indicating a positive trend of better separation with the increasing length of $d(GT)_n$ strands.

Example 10

To complement the analysis of separated fractions using spectrophotometry, fluorescence excitation-emission scans were used. By optically exciting SWNTs and varying the wavelength of excitation, it is possible to better determine the chiral (n, m) make-up of a particular fraction of separated SWNTs as demonstrated by Bachilo and coworkers. (S. M. Bachilo et al., Science 298, 2361-2366 (2002)). In FIG. 11C-F, the fluorescence intensity is plotted against emission and excitation wavelengths for various fractions of separated sodium cholate encapsulated SWNTs.

Example 11

Figure 14A:
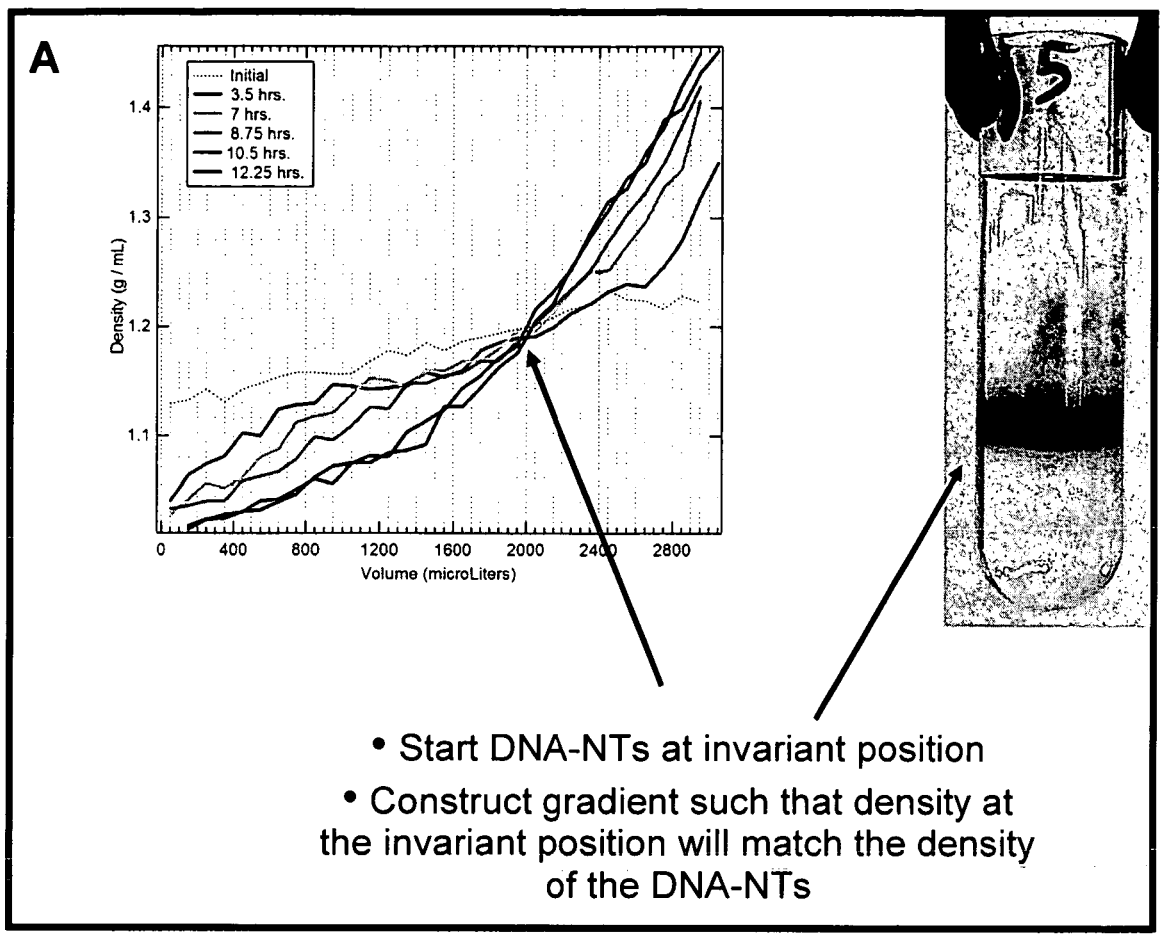
FIG. 14. (A) Redistribution of density gradient/iodixanol concentration over time, with nanotubes seeded initially at the invariant point. (B) After only 3.5 hours of ultracentrifugation at 64 krpm, 22 degrees Celsius, in a TLA100.3 rotor, the DNA wrapped SWNTs ($d(GT)_{20}$) have separated by their electronic and physical structure as evidenced by the distribution curves (determined using the derivative method) and the colored bands that are visible in the centrifuge tube. (Again, the plots and spectra can be numbered consecutively, from shortest duration or wavelength.)
Figure 14B:
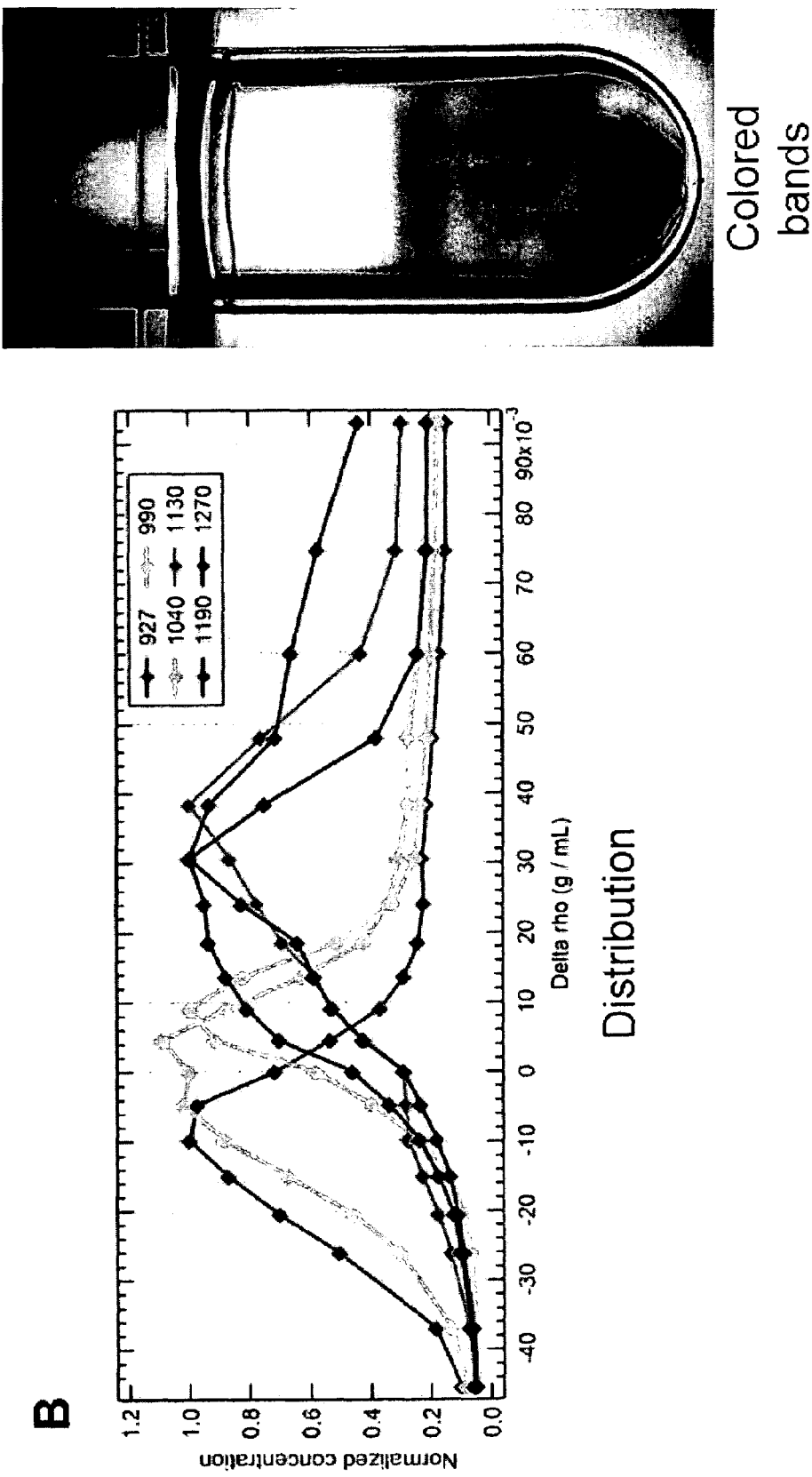
Figure 17:
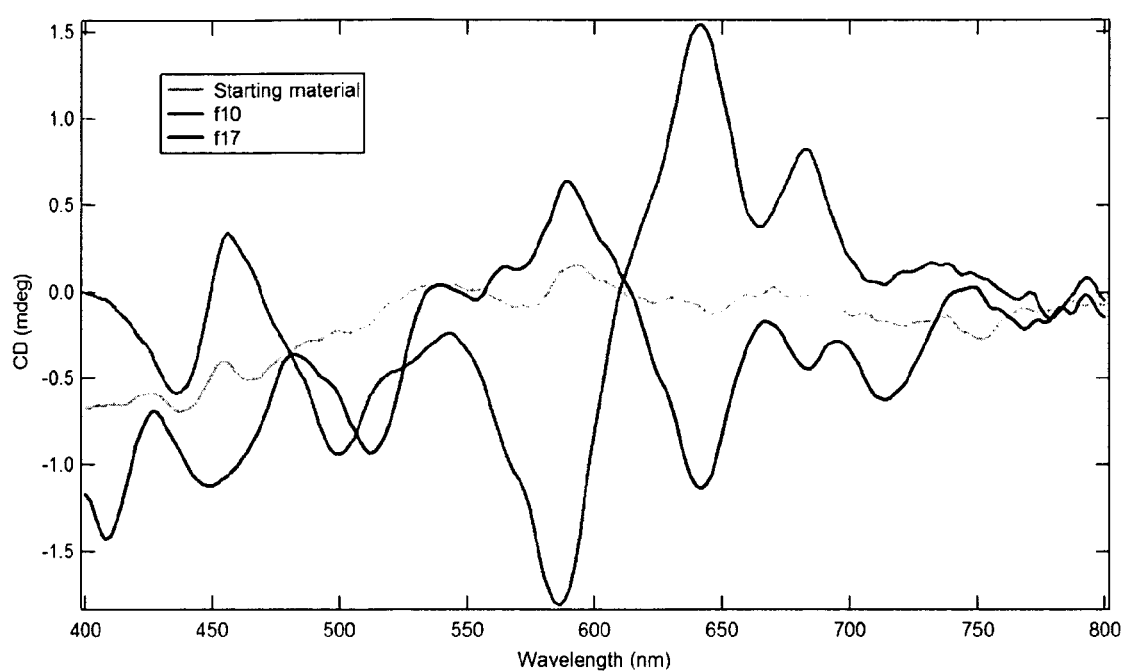
FIG. 17. Circular dichroism spectra showing difference by nanotubes in absorption between left- and right-handed CD signals, indicating bases for separation (as can be numbered consecutively 1 and 2, from lowest fraction number) of two such components (and starting material, 3) using a chiral surfactant such as sodium cholate.

Separation in only 3.5 hours was achieved by layering SWNTs at the invariant point before ultracentrifugation and matching the density of the invariant point to the buoyant density of the SWNTs. There is a spatial point in a centrifuge tube where the density remains roughly constant over time even as the density gradient becomes steeper, hereafter called the invariant point (FIG. 14A). By introducing SWNTs at this invariant point before ultracentrifugation and matching the density of the invariant point to the buoyant density of the SWNTs, the distance SWNTs must sediment to reach their isopycnic point is minimized, allowing for more rapid separation by electronic and physical structure (FIG. 14B). Such an effect was successfully demonstrated using $d(GT)_{20}$-SWNTs in a TLA100.3 rotor, and the concept should be applicable regardless of the encapsulation layer. The buoyant density of SWNTs is a function of the encapsulation layer, and the density gradient should be offset such that the buoyant density and the initial density at the invariant point substantially match. However, because the spatial position of the invariant point should depend on the viscosity of the gradient, the invariant point will be slightly shifted. Nonetheless, the effects should be the same regardless of the encapsulation layer.

Example 12

The relative separation between different chiralities of surfactant-encapsulated single-walled carbon nanotubes (SWNTS) in density gradients can be tuned by varying the pH of the gradient or through the use of a co-surfactant.

Referring to FIGS. 15A-C, these plots depict the concentration of specific chiralities of SWNTs as a function of density within a gradient after separation. The (6, 5), (7, 5) and (9, 5)/(8, 7) chiralities are plotted, from left, as a function of fraction for the case of the following encapsulation agents/conditions: (A) Sodium cholate, no buffer, (B) Sodium cholate, 20 mM Tris buffer, pH ~8.5, (C) Sodium cholate with the addition of sodium dodecyl sulfate (~1:4 SDS:NaCholate by weight) as a co-surfactant. By increasing pH by adding 20 mM Tris buffer, the (7, 5) chirality moves to lower fraction numbers and lower buoyant densities (B). By adding a co-surfactant such as sodium dodecyl sulfate, the (7, 5) and (9, 5)/(8, 7) chiralities move to larger densities. Thus, by adjusting the separation conditions, the isolation of specific (n, m) chiralities can be optimized. (The (9, 5)/(8, 7) chiralities are plotted together due to the overlap of their first order optical transitions near 1270 nm). (Density increases with increasing fraction #).

Example 13

SWNTs grown by laser ablation can also be separated by electronic and physical structure in density gradients. Differing from SWNTs grown by the HiPCO or CoMoCAT methods (diameters from 7-10 Å), laser ablation grown SWNTs are typically larger in diameter (~12-15 Å). The results of this example show the generality of this method can be extended to nanotubes of a larger diameter range.

Referring to the photograph of FIG. 16, after centrifugation in a density gradient, the laser ablation grown tubes (CNI Inc., average diameter 10-16 Å) separate by density into bands of various colors, suggesting separation by electronic structure. In the optical absorbance spectra, the variation in intensity of various peaks with fraction # and density (increasing density with increasing fraction #) also indicates that the laser-ablation grown SWNTs are separating by electronic structure.

The data may also indicate that separation between metallic and semiconducting SWNTs in density gradients is possible. The $1^{st}$ order metallic transitions ($E_{11}{}^{m}$) are thought to be visible between 500-800 nm. If so, this indicates that metallic SWNTs are present in f32 but have been removed in f20 and f26. Raman spectroscopy can be measured for confirmation. (The 2nd and 3rd order transitions for semiconducting SWNTs are identified from 800-1200 nm ($E_{22s}$) and 400-800 nm ($E_{33s}$), respectively. The 1st order transitions for semiconducting SWNTs ($E_{11s}$) are at higher wavelengths and not measurable due to water absorption.) Regardless, the photograph with the many bands of different colors and the varying optical absorbance spectra with fraction # indicate that the laser-ablation-grown SWNTs can also be separated by electronic structure in density gradients.

Example 14

Circular dichroism (CD) (the difference in optical absorption of left- and right-handed circularly polarized light) was measured for surfactant-encapsulated SWNTs separated in a density gradient using a sodium cholate surfactant. The CD signal of sodium cholate encapsulated SWNTs varies with density. The CD signal is much stronger than that measured in control solutions not separated in density gradients, indicating that the use of chiral surfactants such as sodium cholate may enable separation between left- and right-handed SWNTs of the same (n,m) chirality.

Example 15

Figure 18:
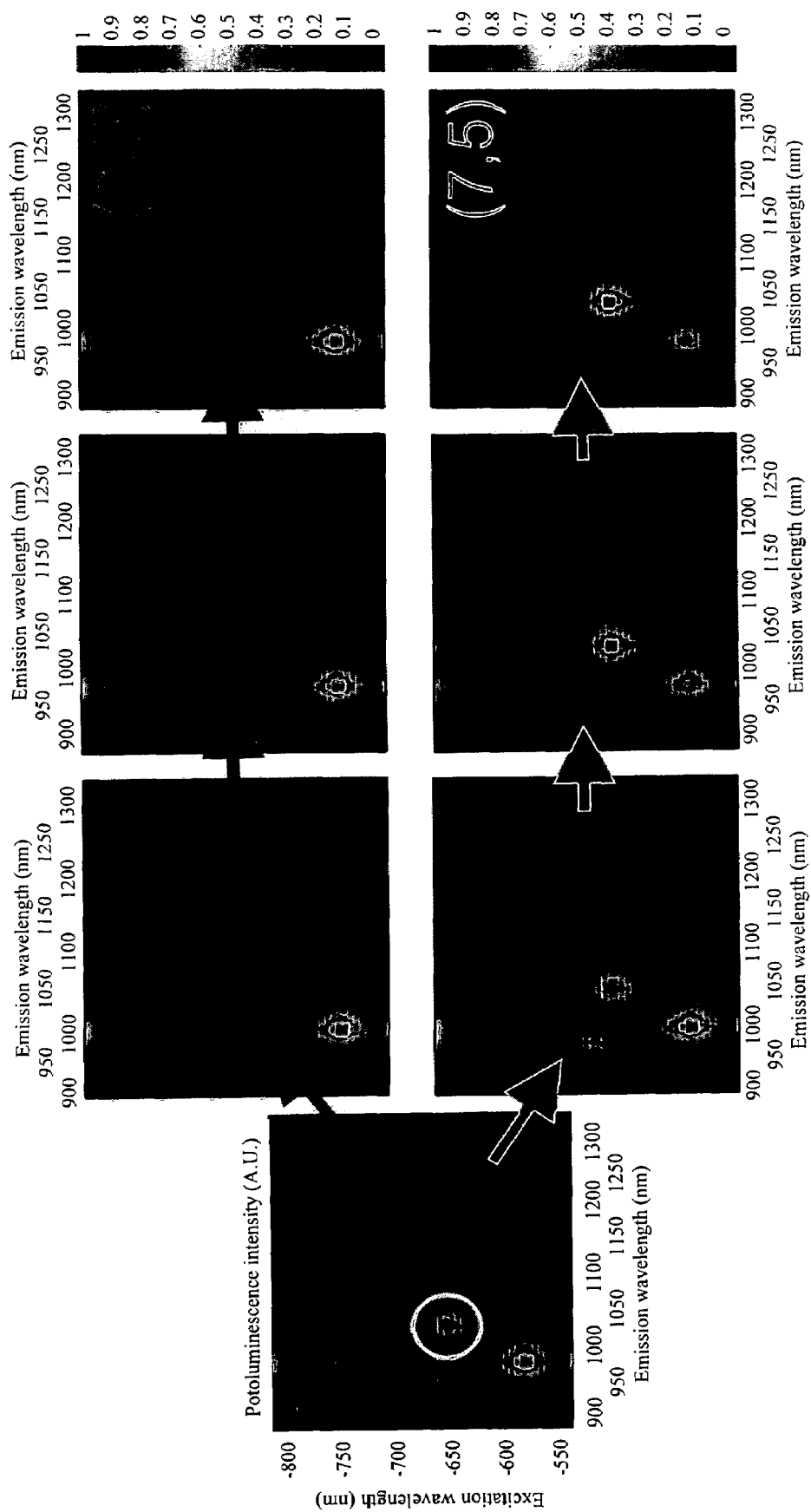
FIG. 18. Successive fluorescence emission/excitation maps showing improved separation of the referenced, top (6,5) and bottom (7,5) chiral nanotubes.

By successively separating sodium cholate encapsulated SWNTs in density gradients, the degree of isolation of specific, target chiralities of SWNTs improves. Referring to FIG. 18, two separate experiments show isolation of the (6, 5) and (7, 5) chiralities after 3 iterations of centrifugation. In the first and second cycles, no buffer or co-surfactant where utilized. In the third cycle, 20 mM Tris buffer was added to improve the separation between the (6, 5) and (7, 5) chiralities and larger diameters (which are similar in density distribution to that observed for the (9, 5)/(8, 7) chiralities in FIG. 10B).

Example 16

Many methods known in the art can be used for removing the surfactant and media from fractions of SWNTs following density gradient centrifugation. Regardless of medium, density gradient or number of separations, the carbon nanotubes can be isolated for further use or characterization. In one such method, fractionated surfactant encapsulated SWNTs were deposited onto functionalized substrates which bind SWNTs stronger than they bind surfactant or density gradient media. More specifically, functionalized Si(111) substrates were capped by a native $SiO_2$ oxide with 3-aminopropyltriethoxysilane (APS). A drop of post-density-gradient-centrifugation surfactant encapsulated SWNTs (diluted into 2% weight per volume sodium dodecyl sulfate) was deposited onto the APS functionalized substrate. After rinsing the substrate in water, bare nanotubes were observed on the surface without surfactant or density gradient media (using atomic force microscopy). The nanotubes were identified as bare by analyzing their heights, which were consistent with known values of SWNTs without surfactant or density gradient media.

Other isolation methods include: (1) Dialysis. By using a dialysis membrane with a cutoff in between the molecular weight of nanotubes (>>10,000 Daltons) and the surfactant and density gradient media (probable molecular weight ~1,000's of Daltons), it is possible to remove the surfactant and density gradient media. (This method is scaled industrially); and (2) Filtration. By using a membrane filter with a pore size shorter than the length of the SWNTs, it is possible to "catch" the nanotubes on the membrane while allowing the surfactant and density gradient media to pass through the membrane. By successively rinsing the nanotubes caught on the membrane with water/solvent, all of the surfactant and density gradient media is eventually removed. (This method is also scaled industrially.) The nanotubes are then removed from the filter for further processing/applications.

Example 17

Atomic force microscopy (AFM) was used to characterize the lengths of the separated HiPCO-grown SWNTs. After separation and fractionation, each 25 μL fraction of separated SWNTs was diluted with 805 μL 0.1 M NaCl and 20 μL 1 M Tris (tris (hydroxymethyl) aminomethane). Then, 20 μL of each diluted fraction was mixed with 10 μL of 20 mM NiCl2 and 10 μL of deionized water. 5-10 μL of this mixture was deposited onto freshly cleaved mica for 120 seconds and then blown off using a N2 air 4 gun. To remove residual iodixanol and salts, each sample was then rinsed in 200 mL of deionized water for 30 seconds. (6 μm)2 areas of fractions 66, 70, 72, and 82 (not shown) were imaged (CP Research, intermittent contact mode, 1024×1024 resolution). Objects on the surfaces that were not obviously nanotubes (objects shorter than 75 nm or with less than a 3:1 aspect ratio) were ignored. Nanotubes that were intersecting such that their lengths could not be determined were also ignored. Overall, 305, 584, 442, and 58 nanotubes were analyzed from fractions 66, 70, 72, and 82, respectively. The mean and standard deviation of length are tabulated in Table 2.

TABLE 2

| | Length Data | |
|---|---|---|
| D | Mean Length | Standard Deviation |
| f66 | 262 nm | 238 nm |
| f70 | 272 nm | 280 nm |
| f72 | 311 nm | 290 nm |
| f82 | 252 nm | 281 nm |

While the principles of this invention have been described in connection with specific embodiments, it should be understood clearly that these descriptions are added only by way of example and are not intended to limit, in any way, the scope of this invention. For instance, consistent with broader aspects of this invention, such methods can be applied more specifically to the separation of available metallic carbon nanotubes.

We claim:

1. A method of using a density gradient to separate single-walled carbon nanotubes, said method comprising:
   centrifuging a nanotube composition in contact with a fluid medium comprising a density gradient; and
   separating the nanotube composition into two or more separation fractions, wherein
   said nanotube composition comprises single-walled carbon nanotubes of mixed nanotube diameters, chiralities, electronic types, or combinations thereof and at least one surface active component; and
   at least one of said two or more separation fractions is enriched with single-walled carbon nanotubes of a selected nanotube diameter, chirality, electronic type, or combinations thereof relative to the nanotube composition.

2. The method of claim 1 comprising isolating said at least one separation fraction from the fluid medium.

3. The method of claim 2 wherein said selected diameter ranges from about 7 Å to about 10 Å.

4. The method of claim 2 wherein said selected diameter ranges from about 12 Å to about 15 Å.

5. The method of claim 2 comprising repeating the contacting, centrifuging and isolating steps using said at least one separation fraction.

6. The method of claim 5 wherein repeating the contacting, centrifuging and isolating steps comprises changing from a preceding separation at least one of said at least one surface active component, said fluid medium, said density gradient, and the pH of said fluid medium.

7. The method of claim 2 comprising determining spectrophotometrically an enrichment factor for single-walled carbon nanotubes of said selected nanotube diameter, chirality, electronic type, or combinations thereof in said at least one separation fraction relative to the nanotube composition, wherein said determining comprises comparison of an absorbance spectrum of said at least one separation fraction with an absorbance spectrum of the nanotube composition.

8. The method of claim 2 comprising determining fluorimetrically an enrichment factor for single-walled carbon nanotubes of said selected nanotube diameter, chirality, electronic type, or combinations thereof in said at least one separation fraction relative to the nanotube composition, wherein said determining comprises comparison of an emission spectrum of said at least one separation fraction with an emission spectrum of the nanotube composition.

9. The method of claim 2 wherein said at least one separation fraction comprises single-walled carbon nanotubes of substantially one chirality.

10. The method of claim 2 wherein said at least one separation fraction comprises single-walled carbon nanotubes of at least two chiralities, said method comprising separating said single-walled carbon nanotubes of at least two chiralities by repeating the centrifuging and isolating steps using said at least one separation fraction.

11. The method of claim 10 wherein separating said single-walled carbon nanotubes of at least two chiralities comprises changing from a preceding separation at least one of said at least one surface active component, said fluid medium, said density gradient, and the pH of said fluid medium.

12. The method of claim 2 wherein said at least one separation fraction comprises single-walled carbon nanotubes of substantially one electronic type.

13. The method of claim 2 comprising removing said at least one surface active component from single-walled carbon nanotubes in said at least one separation fraction to provide bare single-walled carbon nanotubes.

14. The method of claim 1 wherein said at least one surface active component is a single stranded DNA.

15. The method of claim 1 wherein said at least one surface active component is a surfactant.

16. The method of claim 1 wherein said at least one surface active component is a salt of cholic acid selected from a cholate, a deoxycholate, a taurodeoxycholate, and combinations thereof.

17. The method of claim 1 wherein said fluid medium comprises a plurality of aqueous iodixanol concentrations, and said density gradient comprises a range of concentration densities.

18. The method of claim 1 wherein said nanotube composition is in contact with said density gradient at a substantially invariant point of said density gradient during said centrifuging, and said invariant point comprises a density approximating a buoyant density of said nanotube composition.

19. The method of claim 1 wherein said single-walled carbon nanotubes of mixed nanotube diameters, chiralities, electronic types or combinations thereof is produced by a process selected from a high pressure carbon monoxide process, a Co—Mo catalysis process, and a laser ablation process, wherein said single-walled carbon nanotubes comprise a range of diameters determined by said production process.

20. The method of claim 1 wherein said two or more separation fractions are visibly distinguished from each other and comprise differences in color, wherein said differences in color are based on differences in the selected diameter of single-walled carbon nanotubes in said two or more separation fractions.

21. The method of claim 1 wherein said at least one surface active component comprises a surfactant and a co-surfactant.

22. The method of claim 1 wherein said at least one surface active component comprises sodium cholate and sodium dodecyl sulfate.

* * * * *

UNITED STATES PATENT AND TRADEMARK OFFICE
CERTIFICATE OF CORRECTION

PATENT NO. : 7,662,298 B2
APPLICATION NO. : 11/368581
DATED : February 16, 2010
INVENTOR(S) : Hersam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,662,298 B2 |
| APPLICATION NO. | : 11/368581 |
| DATED | : February 16, 2010 |
| INVENTOR(S) | : Mark C. Hersam et al. |

Page 1 of 1

It is certified that error appears in the above-identified patent and that said Letters Patent is hereby corrected as shown below:

In Column 1, lines 7-11, "The United States government has certain rights to this invention pursuant to Grant Nos. DMR-0134706 and EEC-0118025 from the National Science Foundation and Grant No. DE-FG02-00ER45810/A001 from the Department of Energy, all to Northwestern University." should read -- This invention was made with government support under DMR0134706 and EEC0118025 awarded by National Science Foundation and DE-FG02-00ER45810/A001 awarded by Department of Energy. The government has certain rights in the invention. --

Signed and Sealed this
Twenty-seventh Day of November, 2012

David J. Kappos
*Director of the United States Patent and Trademark Office*